US012104408B1

(12) United States Patent
Gira

(10) Patent No.: US 12,104,408 B1
(45) Date of Patent: Oct. 1, 2024

(54) REMOTE SLIDING DOOR LOCKING SYSTEM

(71) Applicant: Richard Raymond Gira, Toronto (CA)

(72) Inventor: Richard Raymond Gira, Toronto (CA)

(*) Notice: Subject to any disclaimer, the term of this patent is extended or adjusted under 35 U.S.C. 154(b) by 0 days.

(21) Appl. No.: 18/649,760

(22) Filed: Apr. 29, 2024

(51) Int. Cl.
*E05B 47/00* (2006.01)
*E05B 41/00* (2006.01)

(52) U.S. Cl.
CPC .......... *E05B 47/0012* (2013.01); *E05B 41/00* (2013.01); *E05B 47/0002* (2013.01); *E05B 2047/0017* (2013.01); *E05B 2047/0021* (2013.01); *E05B 2047/0058* (2013.01); *E05B 2047/0069* (2013.01); *E05B 2047/0095* (2013.01)

(58) Field of Classification Search
CPC ............... Y10T 70/5173; Y10T 70/519; Y10T 70/5195; E05B 47/00; E05B 47/0012; E05B 41/00; E05B 47/0002; E05B 2047/0017; E05B 2047/0021; E05B 2047/0058; E05B 2047/0069; E05B 2047/0095
USPC ............................................................ 70/263
See application file for complete search history.

(56) References Cited

U.S. PATENT DOCUMENTS

| | | | | |
|---|---|---|---|---|
| 11,578,507 B2 * | 2/2023 | Tinker | E05B 15/16 | |
| 2008/0250716 A1 * | 10/2008 | Ranaudo | E06B 3/4636 | 49/31 |
| 2013/0180296 A1 * | 7/2013 | McEachern | E05B 65/08 | 292/300 |

FOREIGN PATENT DOCUMENTS

| | | | |
|---|---|---|---|
| CA | 2215277 A1 * | 3/1998 | |
| CA | 2506635 A1 * | 12/2005 | B62D 53/068 |

* cited by examiner

*Primary Examiner* — Suzanne L Barrett

(57) ABSTRACT

A remote sliding door locking system includes a locking plate, a remote controller, and a remote locking device. The remote locking device includes a housing, a logic board, a locking system, and a power source. The housing includes an interior compartment, a mounting plate, and an exterior surface with a release mechanism slot, at least one input button, and at least one status indicator. The logic board includes a processor, memory, and a communications module. The locking system includes a bolt, a locking mechanism, and a manual release mechanism. The manual release mechanism is operatively engaged to the locking mechanism to drive the movement of the bolt. The logic board communicates with the remote controller by way of the communications module. The logic board and the power source are operatively coupled to the locking system to engage and disengage bolt from the slot by way of the locking mechanism.

18 Claims, 22 Drawing Sheets

REMOTE SLIDING DOOR LOCKING SYSTEM

FIELD OF THE INVENTION

The present invention generally relates to a locking system for a sliding door. More specification, the present invention is able to remotely engage or disengage a locking system for a sliding door.

BACKGROUND OF THE INVENTION

Sliding doors such as those leading to patios, gardens, or balconies, are typically locked, and unlocked from the inside of the domicile. While this is not a problem, changes in housing styles (e.g., remodels, rents, room sharing, etc.,) have led to a need where existing sliding doors become entry points for a person's current or temporary living space. A potential solution is to add a key lock or access control mechanism that allows the sliding door to function as a secure entry and exit point for the domicile.

However, adding key locks to traditional sliding doors presents several challenges. Firstly, the design of sliding doors, which typically operate on tracks with relatively simple latching mechanisms, doesn't lend itself easily to the installation of traditional key locks that require a more secure anchoring point. A key lock needs a stable and solid frame to be drilled into, and sliding doors, especially those made of glass, often don't provide an adequate surface for secure installation.

Another issue is the potential compromise in security. Sliding doors can sometimes be lifted out of their tracks, so even with a key lock added, if the locking mechanism doesn't prevent the door from being lifted, it doesn't significantly improve security. Moreover, the materials used in sliding doors, such as aluminum or PVC, can be less robust than traditional door materials, making it easier for an intruder to breach the door even when a key lock is present.

The installation of key locks on sliding doors can also impact aesthetics and usability. Adding an external lock can detract from the sleek, minimal design that is often a selling point of sliding doors. It can also become a nuisance if the key lock is placed in an inconvenient location, making the door less user-friendly, especially if it requires locking and unlocking each time someone wants to use it.

Another concern with adding a key lock or access control mechanism to a sliding door is durability. Sliding doors are exposed to the elements and frequent use, which can lead to wear and tear on a key lock more quickly than on a standard door. This means the locks may require more frequent replacement or maintenance to ensure they function correctly and provide the necessary security.

Lastly, the modification of a sliding door to add a key lock can sometimes void the warranty provided by the manufacturer. This means if any issues arise with the door's functionality, they may not be covered, leaving the homeowner responsible for any repairs or replacements. While options exist to replace sliding doors with a traditional door is possible, this route would require significant design and remodeling costs, potential permits, and time. Therefore, a need exists for an access control mechanism for sliding doors that overcomes the issues with installing traditional key locks and the burden of replacing and remodeling a home.

BRIEF DESCRIPTION OF THE DRAWINGS

To easily identify the discussion of any particular element or act, the most significant digit or digits in a reference number refer to the figure number in which that element is first introduced.

DETAILED DESCRIPTION OF THE INVENTION

Figure 1:
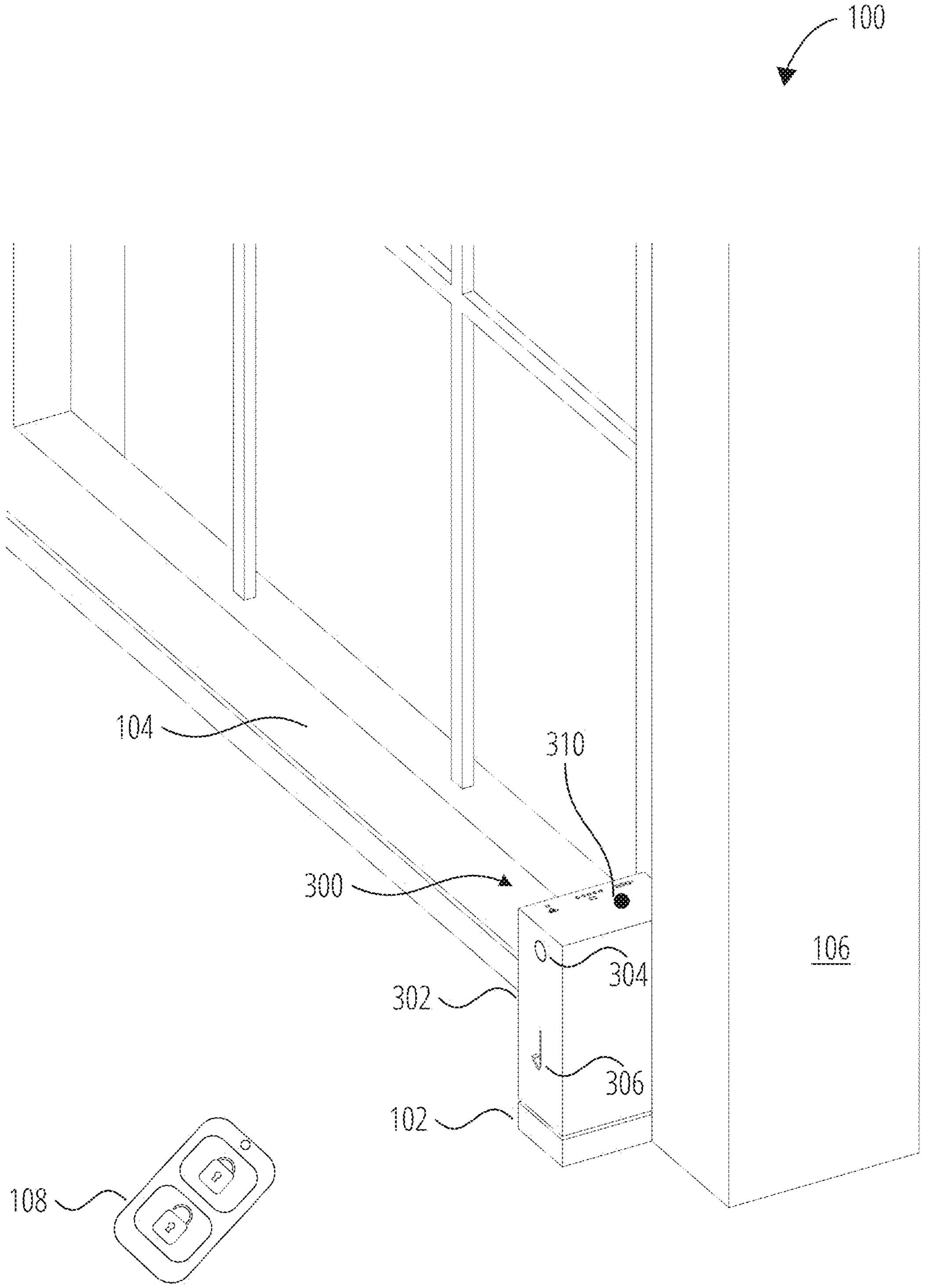
FIG. 1 illustrates a remote sliding door locking system 100 on a sliding door and sliding door frame in a locked configuration in accordance with one embodiment.

All illustrations of the drawings are for the purpose of describing selected versions of the present invention and are not intended to limit the scope of the present invention.

A remote sliding door locking system is provided as an apparatus to safely and securely allow entry into a location through a sliding door. Current sliding doors utilize key locks which make it difficult to access and are not entirely secure. Many sliding doors already have factory key locks that are deemed insecure by their owners who utilize additional security measures such as sticks or bars that are placed in the tracks from the inside to prevent the doors from being opened. There are no simple secure bolt lock solutions that go inside the door, are accessible to unlock from the outside, and that can be added with ease to an existing sliding door. Thus, the remote sliding door locking system is provided to address these deficiencies.

In an embodiment, a remote sliding door locking system comprises a locking plate, a remote controller, and a remote locking device. The remote locking device comprises a housing, a logic board, a locking system, and a power source. The housing comprises an interior compartment, a mounting plate, and an exterior surface comprising a release mechanism slot, at least one input button, and at least one status indicator. The logic board comprises a processor, memory, and a communications module. The locking system comprises a bolt, a locking mechanism, and a manual release mechanism, wherein the manual release mechanism is operatively engaged to the locking mechanism to drive the movement of the bolt. The manual release mechanism traverses the exterior surface by way of the release mechanism slot. The logic board, the bolt, the locking mechanism, and the power source are housed within the interior compartment. The locking plate comprises a slot. The at least one input button and the at least one status indicator are operatively coupled to the logic board. The housing is configured to attach to a sliding door by way of the mounting plate. The locking plate is configured to attach to a sliding door frame. The bolt is operatively aligned with the slot. The logic board is communicably coupled to the remote controller by way of the communications module. The logic board and the power source are operatively coupled to the locking system to engage and disengage bolt from the slot by way of the locking mechanism.

In an embodiment, the locking mechanism comprises a solenoid operatively configured to drive the bolt. Solenoid locking mechanisms are a type of electromechanical lock that utilizes an electromagnetic solenoid to control the locking and unlocking function. At the core of this mechanism is a solenoid, which is a coil of wire that becomes magnetized when an electric current passes through it. This magnetic field then actuates a plunger or armature, which moves to either lock or unlock the mechanism depending on the direction of the movement. In its default state, the mechanism can be designed to either keep the lock secure (fail-secure) or allow it to be open (fail-safe), ensuring that it meets the specific security or safety requirements of its application. Solenoid locks are widely appreciated for their quick operation, reliability, and the ability to be controlled remotely, making them suitable for a variety of applications, including access control systems, safety interlocks in industrial machinery, and secure compartments in vehicles. The versatility of solenoid locking mechanisms, combined with their compact size and the fact that they can be integrated into electronic control systems, allows for sophisticated security solutions. These systems can include features such as timed access, multiple user codes, and integration with broader security or building management systems, providing a high level of control and customization for enhanced security.

In an embodiment, the locking mechanism comprises a mechanical lock and a motor.

In an embodiment, the locking system comprises optical sensors operatively coupled to the logic board, wherein the optical sensors detect alignment between the bolt and the slot.

In an embodiment, the at least one status indicator comprises a battery status indicator and a wireless connectivity indicator.

In an embodiment, the at least one input button is configured to pair the remote controller with the logic board.

In an embodiment, the at least one input button includes a status indicator for the engagement of the bolt with the slot.

In an embodiment, the power source is a rechargeable battery.

In an embodiment, the power source is a removable battery.

In an embodiment, the remote controller is button operated controller operating in communication with the communications module.

In an embodiment, the remote controller is an application operating on a mobile device in communication with a communications module.

In an embodiment, the bolt is of significant length that prevents it from being disengaged by lifting the sliding door off the tracks.

In an embodiment, a remote sliding door locking system comprises a locking plate, a remote controller, and a remote locking device. The remote locking device comprises a housing, a logic board, a locking system, and a power source. The housing comprises an interior compartment, a mounting plate, and an exterior surface comprising a release mechanism slot, at least one input button, and at least one status indicator. The logic board comprises a processor, memory, and a communications module. The locking system comprises a bolt, a locking mechanism, and a manual release mechanism, wherein the manual release mechanism is operatively engaged to the locking mechanism to drive the movement of the bolt. The manual release mechanism traverses the exterior surface by way of the release mechanism slot. The logic board, the bolt, the locking mechanism, and the power source being housed within the interior compartment. The locking plate comprises a slot. The at least one input button and the at least one status indicator being operatively coupled to the logic board. The housing being configured to attach to a sliding door by way of the mounting plate. The locking plate being configured to attach to a sliding door frame. The bolt being operatively aligned with the slot. The logic board being communicably coupled to the remote controller by way of the communications module. The logic board and the power source being operatively coupled to the locking system to engage and disengage bolt from the slot by way of the locking mechanism. The locking system comprises optical sensors operatively coupled to the logic board, wherein the optical sensors detect alignment between the bolt and the slot. The at least one status indicator comprises a battery status indicator and a wireless connectivity indicator. The at least one input button is configured to pair the remote controller with the logic board. The at least one input button includes a status indicator for the engagement of the bolt with the slot.

In an embodiment, the locking mechanism comprises a solenoid operatively configured to drive the bolt.

In an embodiment, the locking mechanism comprises a mechanical lock and a motor.

In an embodiment, the power source is a rechargeable battery.

In an embodiment, the power source is a removable battery.

In an embodiment, the remote controller is button operated controller operating in communication with the communications module. The button operated controller may be a key fob like device that may include at least one button for changing the engagement position of the lock. The at least one button may be pressed by a user to lock and unlock the remote locking device. The key fob may have more than one button for locking and unlocking the remote locking device. The button operated controller and the remote locking device may operate on a variety of radio frequencies (RF) to communicate. The most common of these RF frequency bands used by may be the 315 MHz and 433 MHZ ranges, particularly in North America and Europe, respectively. These frequencies may be chosen for their balance between range and power efficiency, making them suitable for short-range communication. Additionally, the button operated controller may operate on the 868 MHz and 915 MHz bands, which are also allocated for similar short-range communication purposes in various regions around the world. The button operated controller may also utilize the 2.4 GHz frequency band for enhanced security features like encryption and rolling codes. This band, widely used in Wi-Fi and Bluetooth technologies, allows for more sophisticated communication and security protocols, providing an additional layer of protection against unauthorized access and hacking attempts.

In an embodiment, the remote controller is an application operating on a mobile device in communication with a communications module. The application may provide the status of the remote locking device such as the battery level and the engagement position of the lock being either locked or unlocked. Furthermore, the application may provide feedback in the form of an audible sound, vibration, and/or display a graphic indicating the change of the engagement position. The remote controller configured as an application on a mobile device may have access to various forms of wireless communication such as Wi-Fi, Bluetooth, NFC, and (RF) bands.

In an embodiment, the remote controller configured as either the button operated controller or the application on a mobile device may include a requirement for biometric verification. The biometric verification may be accomplished by a fingerprint reader on the button operated controller or the mobile device running the application. The biometric verification may require that a user register their fingerprint that is checked by the button operated controller or application when the user is attempting to unlock or lock the remote locking device.

In an embodiment, a method of operating a remote sliding door locking system involves determining a bolt engagement status of a bolt in a locking system by powering a locking mechanism and detecting resistance. The method communicates the bolt engagement status to a remote controller by way of a communications module. The method operates the locking mechanism to drive the bolt to an engagement position in response to receiving a lock command from the remote controller by way of the communications module. The method operates the locking mechanism to drive the bolt to a disengagement position in response to receiving an unlock command from the remote controller by way of the communications module.

In an embodiment, the remote controller is an application operating on a mobile device in communication with a communications module.

FIG. 1 through FIG. 8 illustrate embodiments of the remote locking device 300 of a remote sliding door locking system 100. The remote sliding door locking system 100 comprises a locking plate 102, a remote locking device 300, and a remote controller 108.

The remote locking device 300 comprises a housing 302, a logic board 316, a locking system 320, and a power source 318. The housing 302 comprises an interior compartment 340, a mounting plate 342, and an exterior surface 310 comprising a release mechanism slot 322, at least one input button 304, at least one status indicator 336 (i.e., wireless connectivity indicator 308 and the battery status indicator 312), and a charge port 314. The logic board 316 comprises a processor 332, memory 330, and a communications module 328. The locking system 320 comprises a bolt 326, a locking mechanism 324, and a manual release mechanism 306, wherein the manual release mechanism 306 is operatively engaged to the locking mechanism 324 to drive the movement of the bolt 326. The manual release mechanism 306 traverses the exterior surface 310 by way of the release mechanism slot 322. The locking plate 102 comprises a slot 110. The at least one input button and the at least one status indicator 336 are operatively coupled to the logic board 316. The housing 302 is configured to attach to a sliding door 104 by way of the mounting plate 342. The locking plate 102 is configured to attach to a sliding door frame 106. The bolt 326 is operatively aligned with the slot 110. The logic board 316 is communicably coupled to the remote controller 108 by way of the communications module 328. The logic board 316 and the power source 318 are operatively coupled to the locking system 320 to engage and disengage bolt 326 from the slot 110 by way of the locking mechanism 324.

The logic board 316 comprises the communications module 328, the processor 332, and the memory 330. Additionally, the power source 318 in the form of a rechargeable battery is provided with mounting to the logic board 316. Furthermore, the logic board 316 is coupled to locking system 320 comprising the bolt 326 and the manual release mechanism 306. In the embodiment of the remote locking device 300 the locking mechanism 324 is a solenoid 334 where the movement of the bolt 326 is electromechanically controlled. The manual release mechanism 306 is seen coupled to the bolt 326 to allow movement of the bolt 326. The manual release mechanism 306 is a lever that is outside the magnetized area of the solenoid 334.

FIG. 1 illustrates a remote sliding door locking system 100 on a sliding door 104 and sliding door frame 106 in a locked configuration in accordance with one embodiment. The remote sliding door locking system 100 comprises the locking plate 102, a remote controller 108, and a remote locking device 300. The remote locking device 300 is mounted on the sliding door 104 in a locked configuration.

Figure 2:
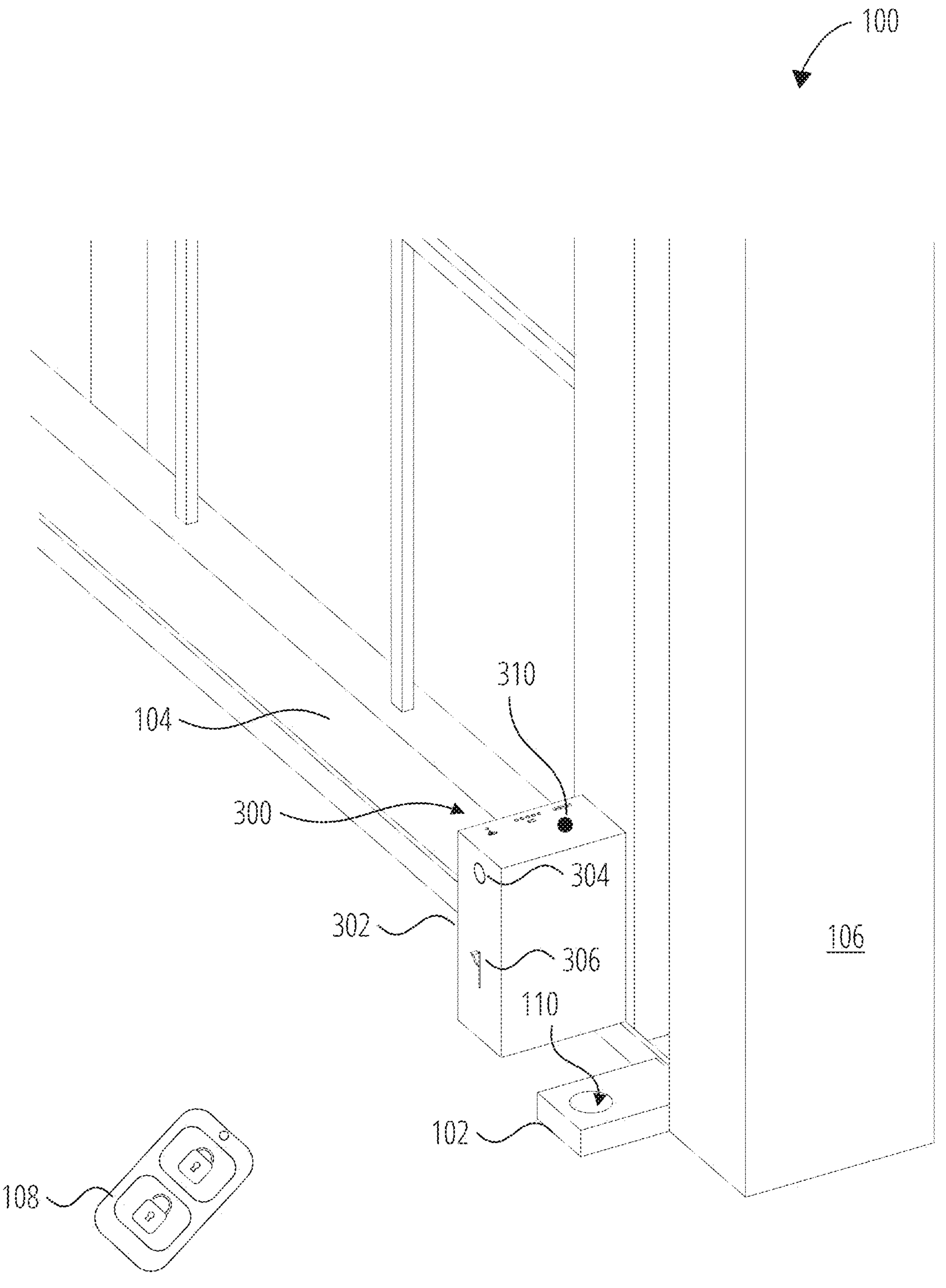
FIG. 2 illustrates the remote sliding door locking system 100 on a sliding door and sliding door frame in an unlocked configuration in accordance with one embodiment.

FIG. 2 illustrates the remote sliding door locking system 100 on a sliding door 104 and sliding door frame 106 in an unlocked configuration in accordance with one embodiment.

In FIG. 2, the remote sliding door locking system 100 is shown with the locking plate 102 comprising a slot 110, the sliding door 104, the sliding door frame 106, the remote controller 108, and the remote locking device 300 comprising the housing 302, the at least one input button 304, the manual release mechanism 306, and the exterior surface 310 visible.

The remote locking device 300 is mounted on the sliding door 104 is moved away from the locking plate 102 allowing the sliding door 104 to open. The locking plate 102 is positioned on the floor near the frame of the sliding door and may be configured to attach to track or directly to the sliding door frame 106 through brackets or by being drilled directly into the floor.

Figure 3:
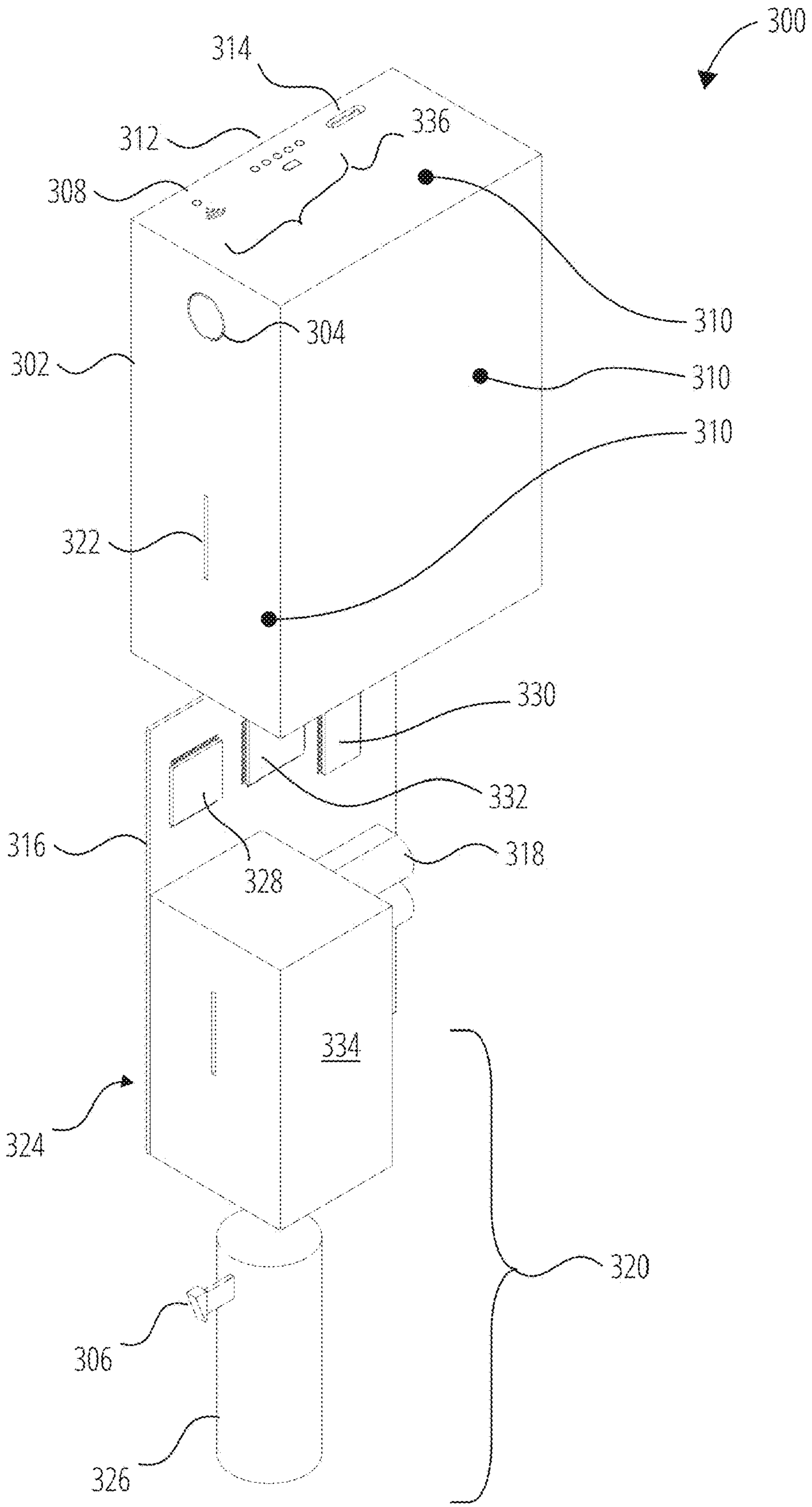
FIG. 3 illustrates an exploded view of the remote locking device 300 in accordance with one embodiment.

FIG. 3 illustrates an exploded view of the remote locking device 300 in accordance with one embodiment. The remote locking device 300 is shown with the housing 302, the at least one input button 304, the manual release mechanism 306, the wireless connectivity indicator 308, the exterior surface 310, the battery status indicator 312, the charge port 314, the logic board 316, the power source 318, the locking system 320, the release mechanism slot 322, the locking mechanism 324, the bolt 326, the communications module 328, the memory 330, the processor 332, the solenoid 334, and the at least one status indicator 336 visible.

Figure 4:
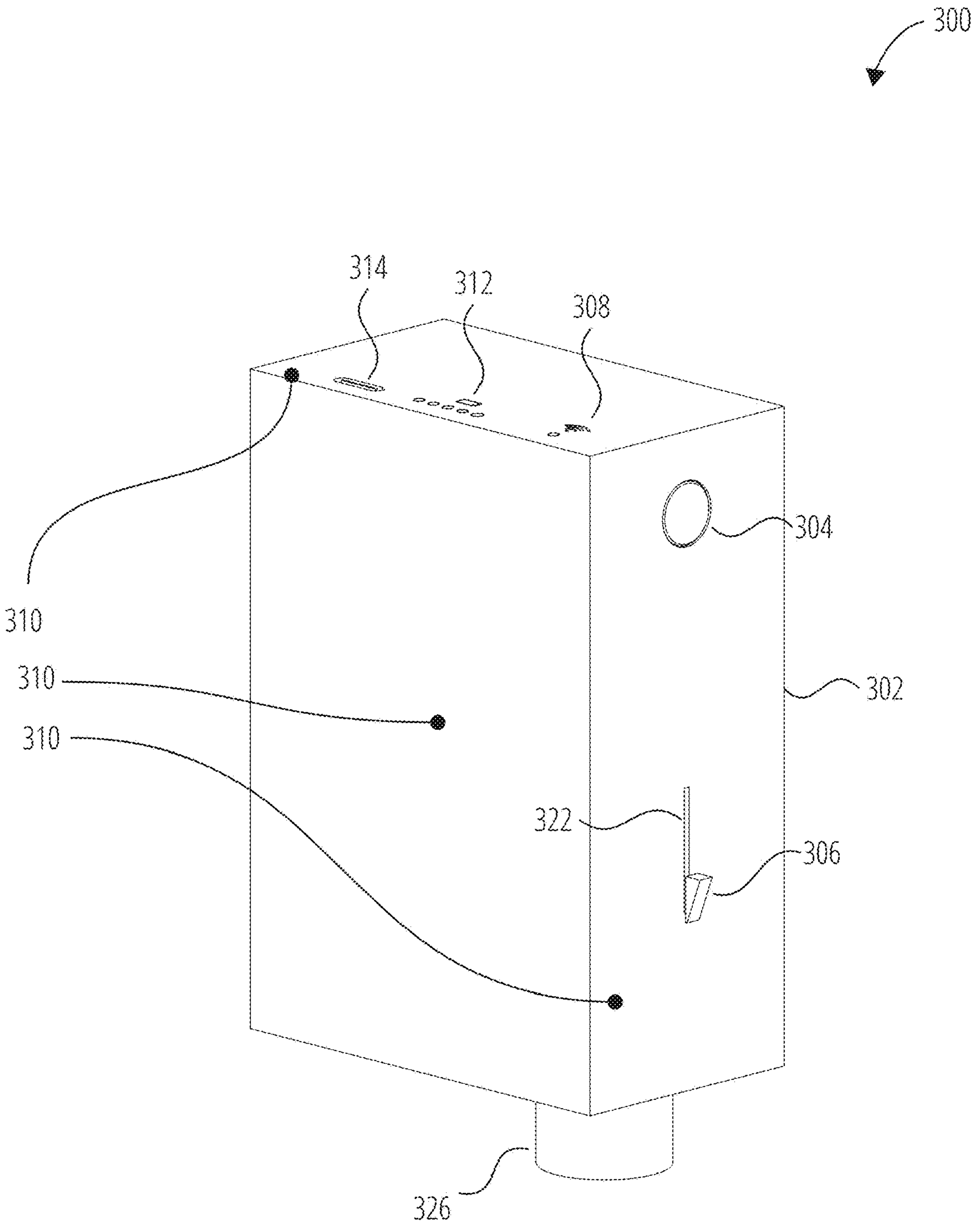
FIG. 4 illustrates a top isometric view of the remote locking device 300 in accordance with one embodiment.

FIG. 4 illustrates a top isometric view of the remote locking device 300 in accordance with one embodiment. The remote locking device 300 is shown with the housing 302, the at least one input button 304, the manual release mechanism 306, the wireless connectivity indicator 308, the exterior surface 310, the battery status indicator 312, the charge port 314, the release mechanism slot 322, and the bolt 326 visible.

The remote locking device 300 is in the locked configuration where the bolt 326 is out. The at least one input button 304 may include functionality to include a status indicator for the engagement position of the bolt 326.

Figure 5:
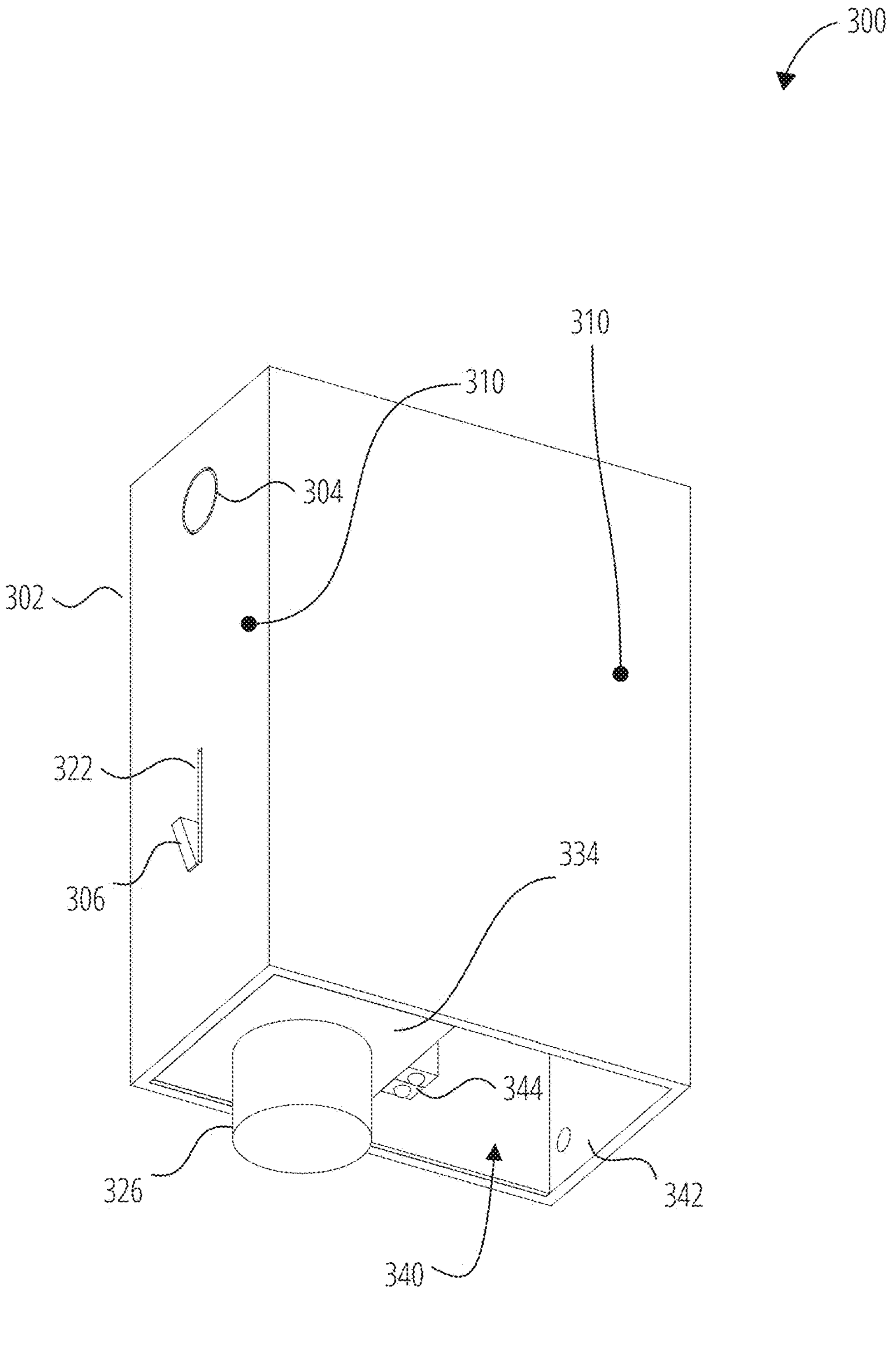
FIG. 5 illustrates a bottom isometric view of the remote locking device 300 in accordance with one embodiment.

FIG. 5 illustrates a bottom isometric view of the remote locking device 300 in accordance with one embodiment. The remote locking device 300 is shown with the housing 302, the at least one input button 304, the manual release mechanism 306, the exterior surface 310, the release mechanism slot 322, the bolt 326, the solenoid 334, the interior compartment 340, the mounting plate 342, and the optical sensors 344 visible.

The remote locking device 300 is shown with optical sensors 344 visible through an opening for the interior compartment 340. The optical sensors 344 may serve to verify alignment of the bolt 326 with the slot 110. The optical sensors 344 may detect alignment by sensing a visual alignment indicator on the locking plate 102. In another embodiment the optical sensors 344 may be aligned to detect the slot 110.

Figure 6:
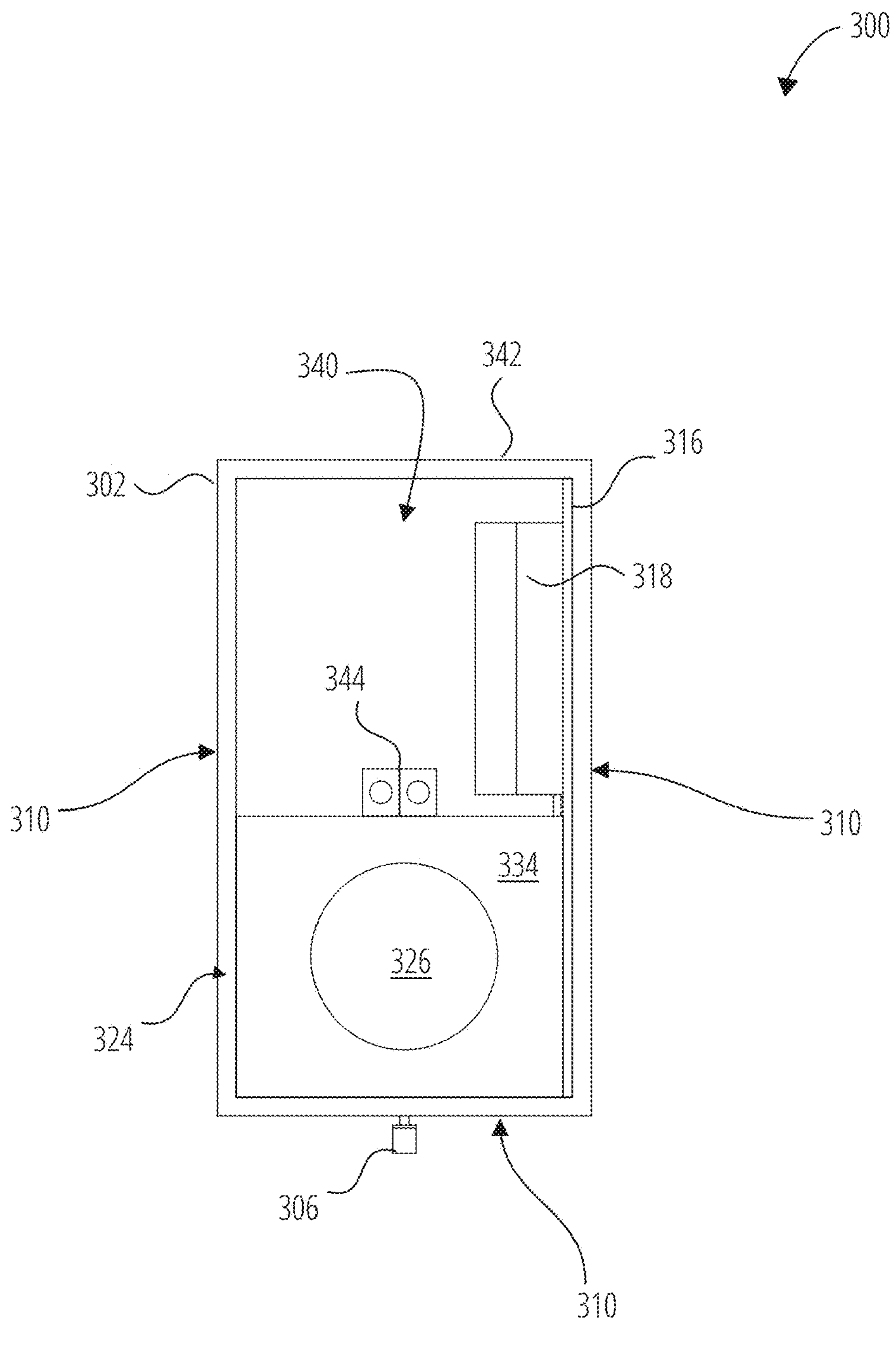
FIG. 6 illustrates a bottom view of the remote locking device 300 in accordance with one embodiment.

FIG. 6 illustrates a bottom view of the remote locking device 300 showing the housing 302, the manual release mechanism 306, the exterior surface 310, the remote locking device 300, the logic board 316, the power source 318, the locking mechanism 324, the bolt 326, the solenoid 334, the interior compartment 340, the mounting plate 342, and the optical sensors 344 visible.

Figure 7:
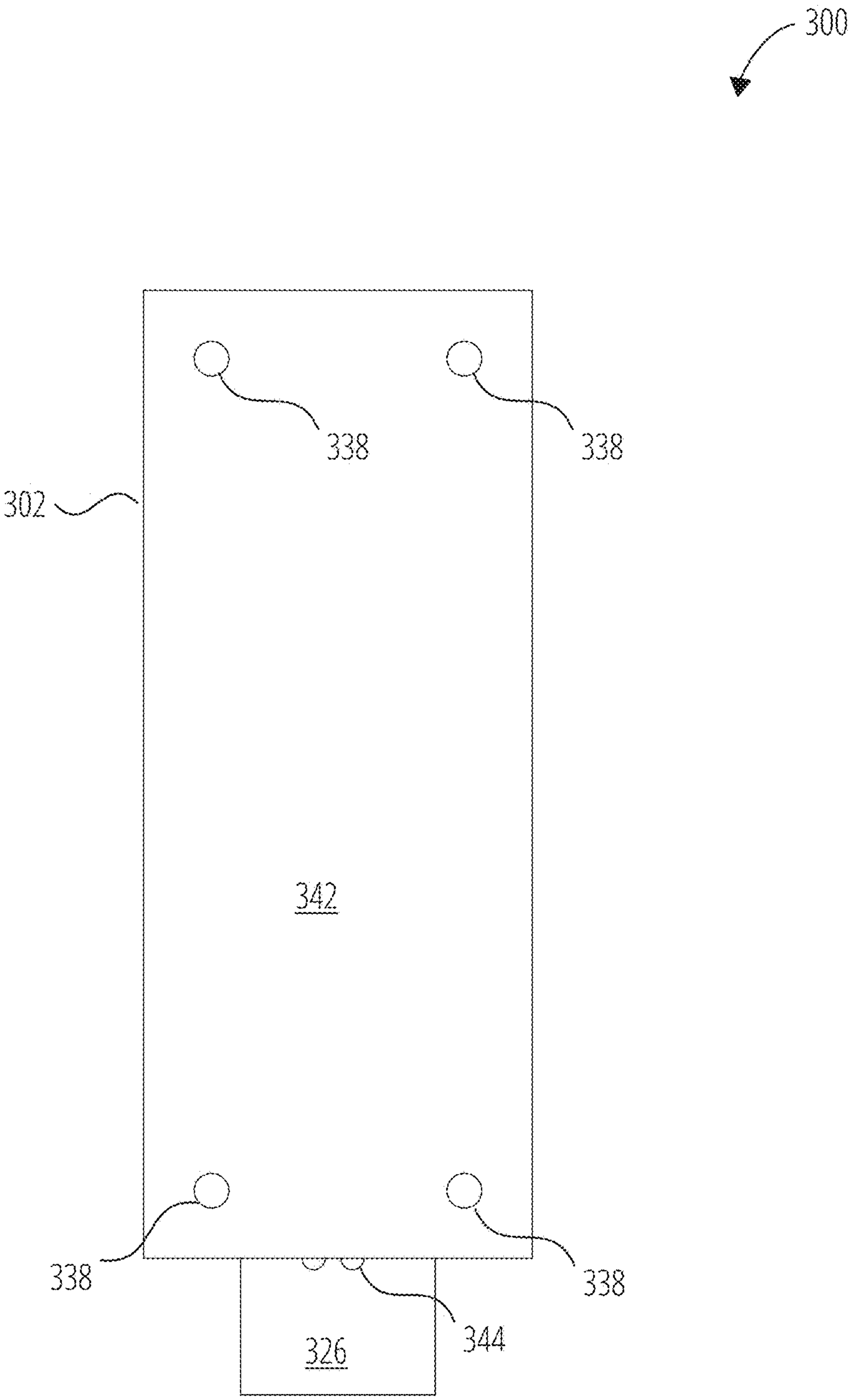
FIG. 7 illustrates a rear view of the remote locking device 300 in accordance with one embodiment.

FIG. 7 illustrates a rear view of the remote locking device 300 in accordance with one embodiment. The remote locking device 300 is shown the housing 302, the bolt 326, the fastener holes 338, the mounting plate 342, and the optical sensors 344 visible.

The remote locking device 300 is shown with the mounting plate 342 in view with fastener holes 338 allowing engagement to the sliding door 104 with fasteners such as set screws.

Figure 8:
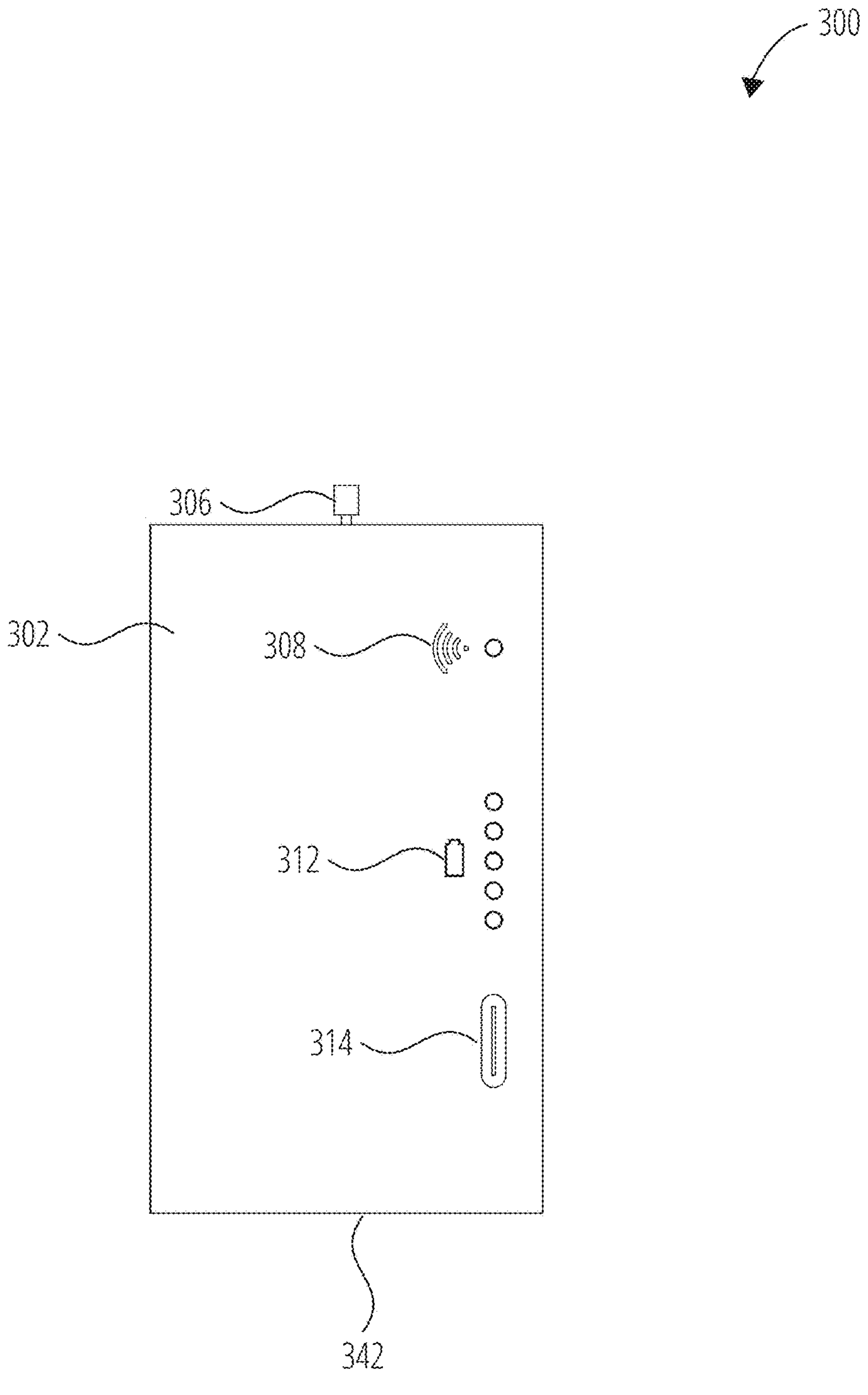
FIG. 8 illustrates a top view of the remote locking device 300 in accordance with one embodiment.

FIG. 8 illustrates a top view of the remote locking device 300 showing the housing 302, the manual release mechanism 306, the remote locking device 300, the wireless connectivity indicator 308, the battery status indicator 312, the charge port 314, and the mounting plate 342.

FIG. 9 through FIG. 16B illustrate an embodiment of a remote sliding door locking system 1000. The remote sliding door locking system 1000 comprises a remote locking device 900, a locking plate 1002, and a remote controller 1006.

The remote locking device 900 comprises a housing 902, a logic board 920, a locking system 932, and a power source 928. The housing 902 comprises an interior compartment 944, a mounting plate 940, and an exterior surface 918 comprising a release mechanism slot 938, at least one input button 906, and at least one status indicator 912 (i.e., battery status indicator 914 and wireless connectivity indicator 916). The logic board 920 comprises a processor 924, memory 926, and a communications module 922. The locking system 932 comprises a bolt 908, a locking mechanism 934, and a manual release mechanism 904, wherein the manual release mechanism 904 is operatively engaged to the locking mechanism 934 to drive the movement of the bolt 908. The manual release mechanism 904 traverses the exterior surface 918 by way of the release mechanism slot 938. The logic board 920, the bolt 908, the locking mechanism 934, and the power source 928 are housed within the interior compartment 944. The locking plate 1002 comprises a slot 1004. The at least one input button 906 and the at least one status indicator 912 are operatively coupled to the logic board 920. The housing 902 is configured to attach to a sliding door 1008 by way of the mounting plate 940. The locking plate 1002 is configured to attach to a sliding door frame 1010. The bolt 908 is operatively aligned with the slot 1004. The logic board 920 is communicably coupled to the remote controller 1006 by way of the communications module 922. The logic board 920 and the power source 928 are operatively coupled to the locking system 932 to engage and disengage bolt 908 from the slot 1004 by way of the locking mechanism 934. The at least one status indicator 912 comprises a battery status indicator 914 and a wireless connectivity indicator 916. The at least one input button 906 may be configured to pair the remote controller 1006 with the logic board 920. The at least one input button 906 may include a status indicator in the form of a light (e.g., green light or red light) for the engagement of the bolt with the slot.

In an embodiment, a remote sliding door locking system 1000 comprises a locking plate 1002, a remote controller 1006, and a remote locking device 900.

Figure 9:
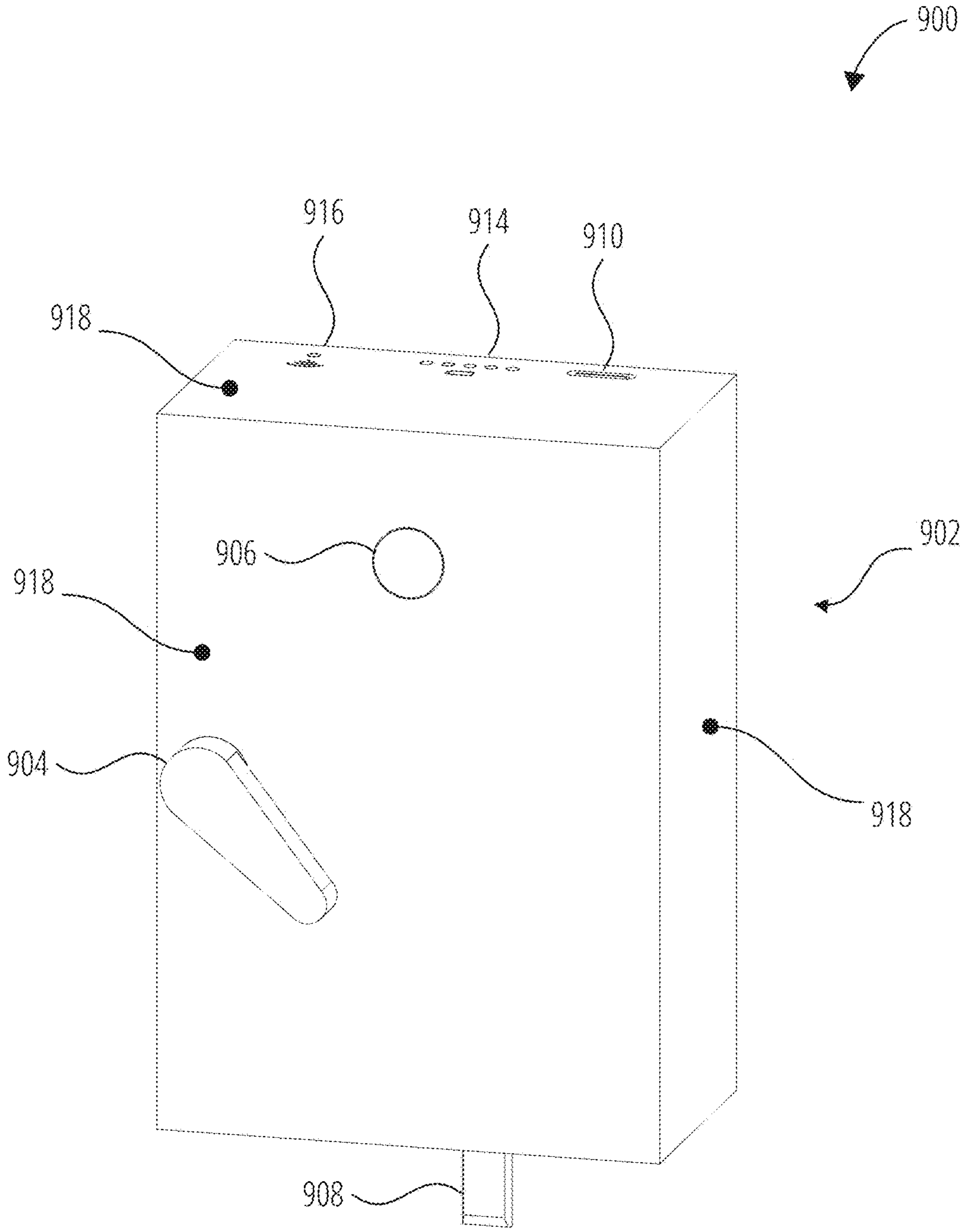
FIG. 9 illustrates an isometric view of the remote locking device 300 in accordance with one embodiment.

FIG. 9 illustrates an isometric view of the remote locking device 900 in accordance with one embodiment. The remote locking device 900 is shown in a locked configuration. The remote locking device 900 is shown with the housing 902, the manual release mechanism 904, the at least one input button 906, the bolt 908, the charge port 910, the battery status indicator 914, the wireless connectivity indicator 916, and the exterior surface 918 visible.

Figure 10:
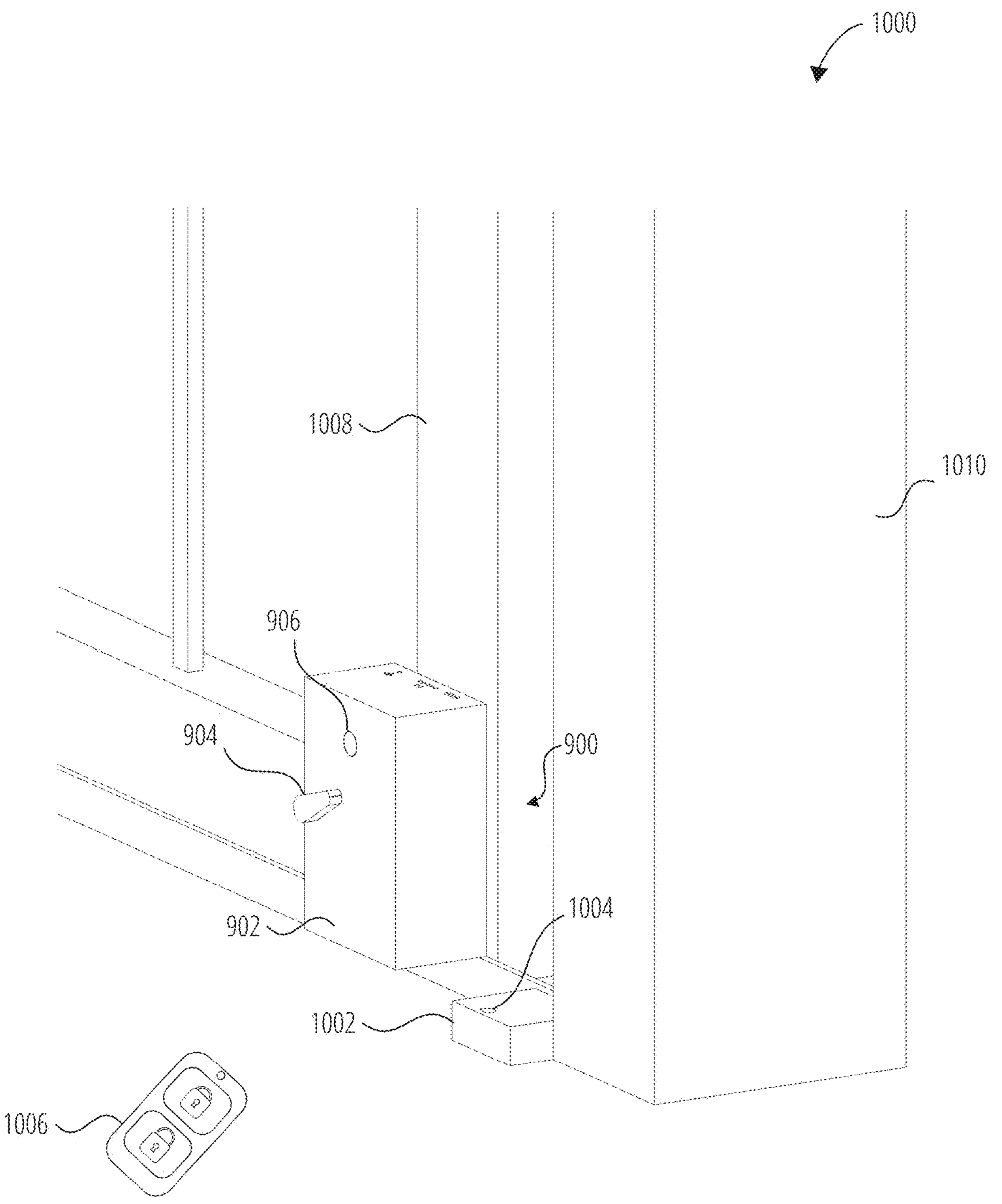
FIG. 10 illustrates a remote sliding door locking system 1000 on a sliding door and sliding door frame in an unlocked configuration in accordance with one embodiment.

FIG. 10 illustrates a remote sliding door locking system 1000 on a sliding door 1008 and sliding door frame 1010 in an unlocked configuration. The remote locking device 900 is shown mounted to the sliding door 1008 in an unlocked position and disengaged from the locking plate 1002 comprising the slot 1004.

Figure 11:
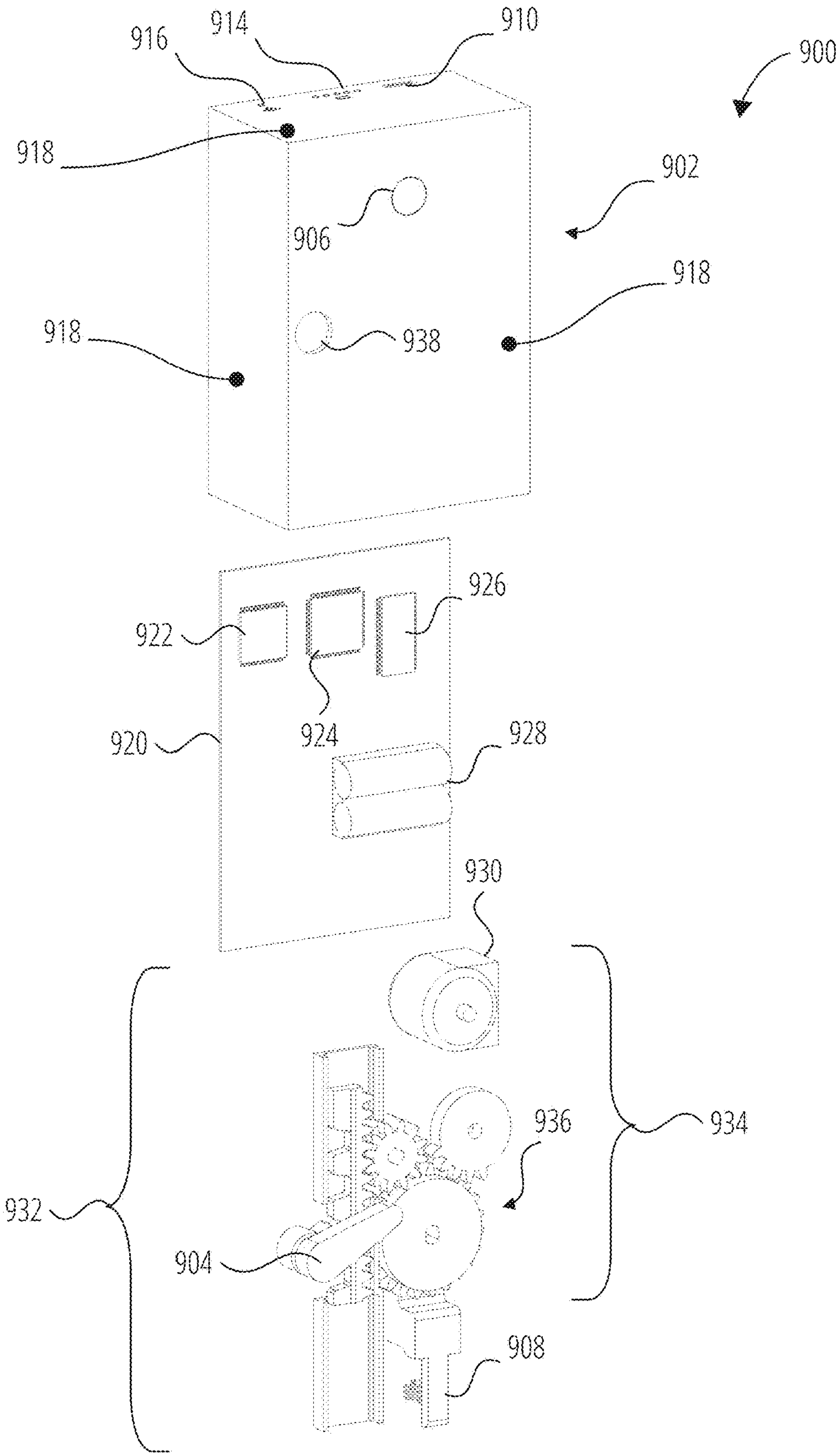
FIG. 11 illustrates an exploded view of the remote locking device 900 in accordance with one embodiment.

FIG. 11 illustrates an exploded view of the remote locking device 900. The remote locking device 900 is shown with the housing 902, the manual release mechanism 904, the at least one input button 906, the bolt 908, the charge port 910, the battery status indicator 914, the wireless connectivity indicator 916, the exterior surface 918, the logic board 920, the communications module 922, the processor 924, the memory 926, the power source 928, the motor 930, the locking system 932, the locking mechanism 934, the mechanical lock 936, and the release mechanism slot 938 visible.

The logic board 920 is shown with the communications module 922, processor 924, and a memory 926. A power source 928 is shown mounted on the logic board 920. The remote locking device 300 shows a locking system 932 comprising a locking mechanism 934, a bolt 908, and the manual release mechanism 904. The locking mechanism 934 is configured as a mechanical lock 936 and includes a motor 930 that powers the movement of gears moving the bolt 908 between engagement positions (i.e., locked configuration, unlocked configuration).

Figure 12:
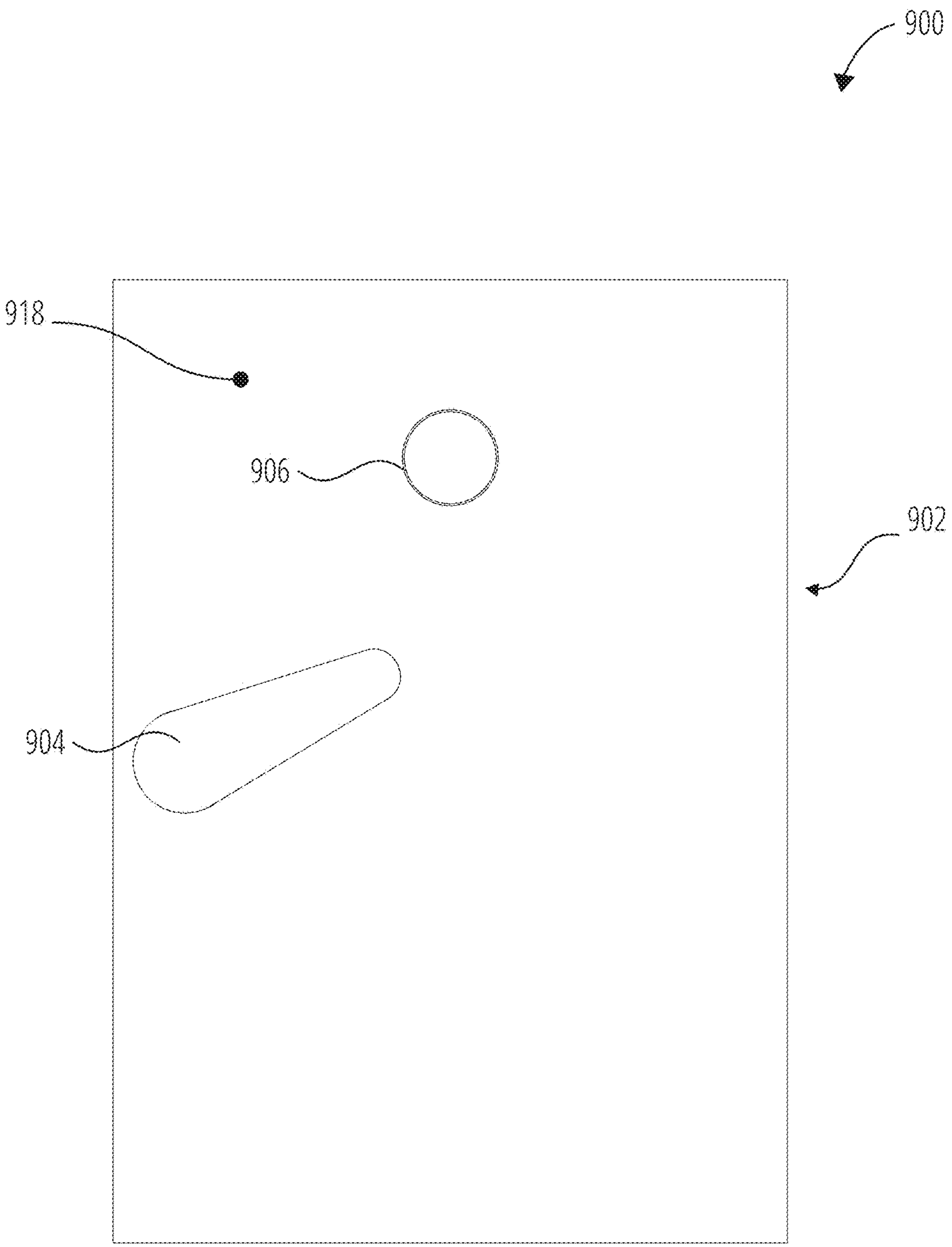
FIG. 12 illustrates a front view of the remote locking device 900 in accordance with one embodiment.

FIG. 12 illustrates a front view of the remote locking device 900 comprising the housing 902, the manual release mechanism 904, the at least one input button 906, and the exterior surface 918.

Figure 13:
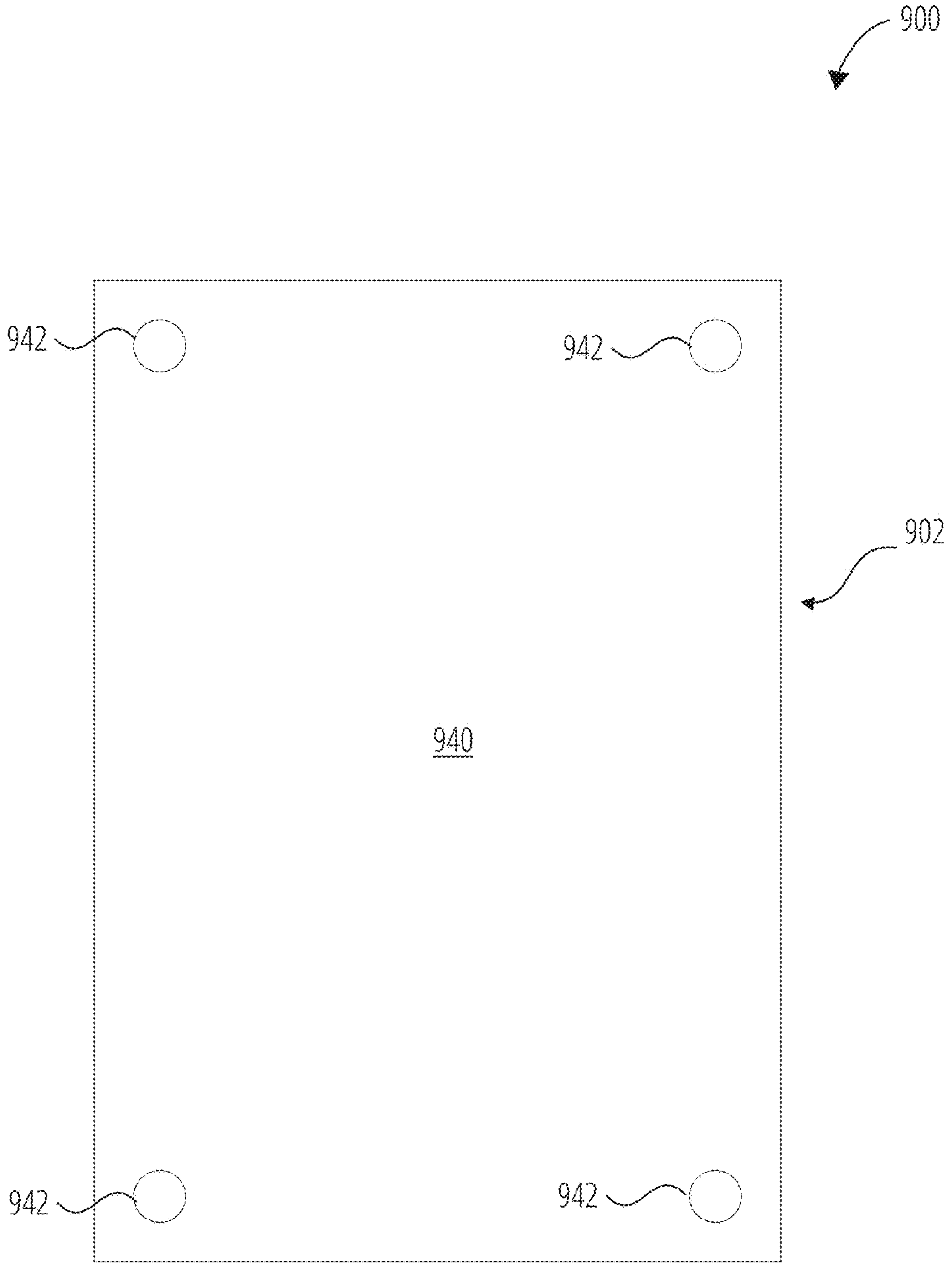
FIG. 13 illustrates a rear view of the remote locking device 900 in accordance with one embodiment.

FIG. 13 illustrates a rear view of the remote locking device 900 in accordance with one embodiment. The remote locking device 900 is shown with the mounting plate 940 of the housing 902 showing the fastener holes 942 that allow mounting the remote locking device 900 to the sliding door 1008.

Figure 14:
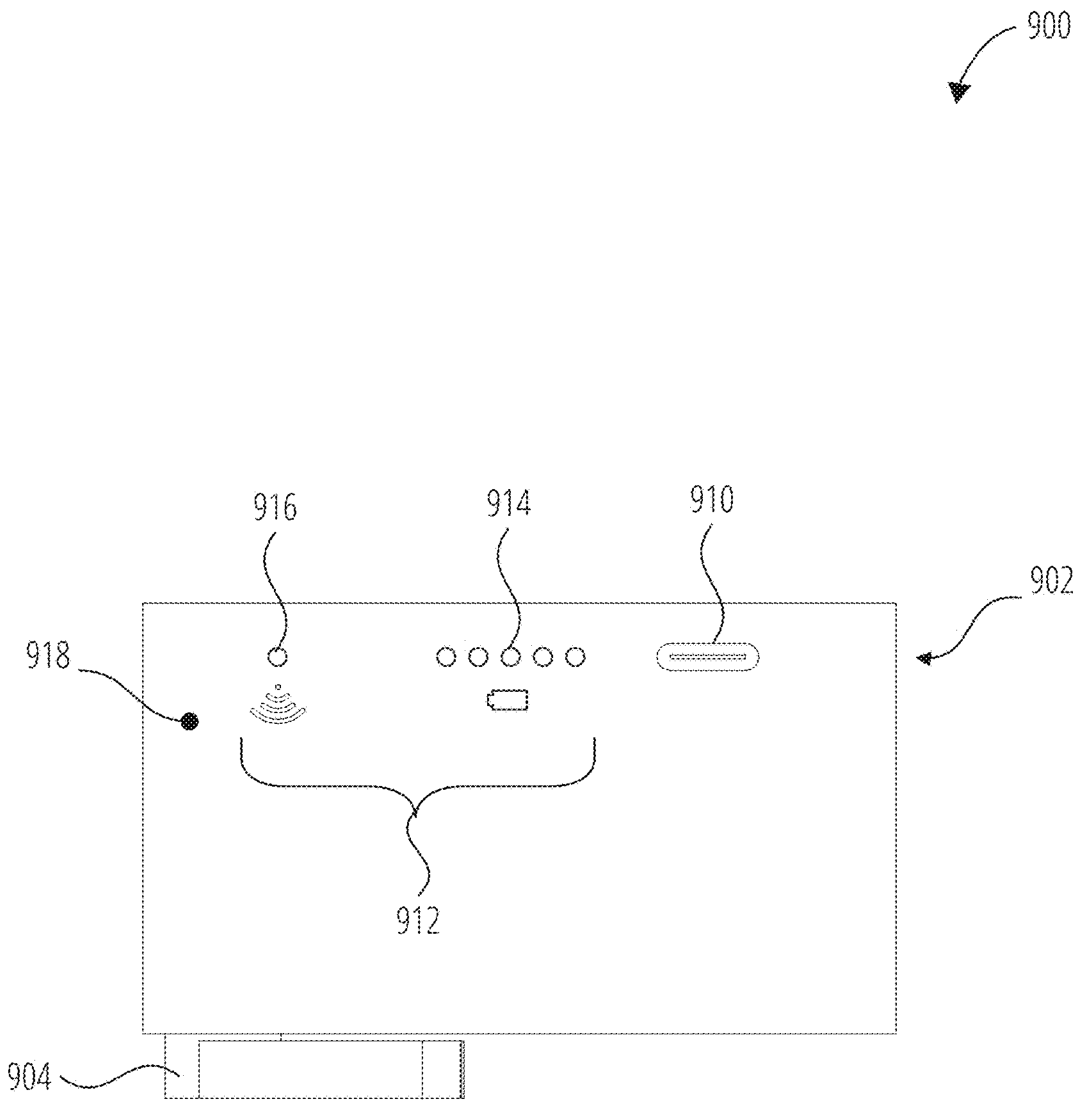
FIG. 14 illustrates a top view of the remote locking device 900 in accordance with one embodiment.

FIG. 14 illustrates a top view of the remote locking device 900 comprising the housing 902, the manual release mechanism 904, the charge port 910, the exterior surface 918, and the at least one status indicator 912 comprising the battery status indicator 914 and the wireless connectivity indicator 916.

Figure 15B:
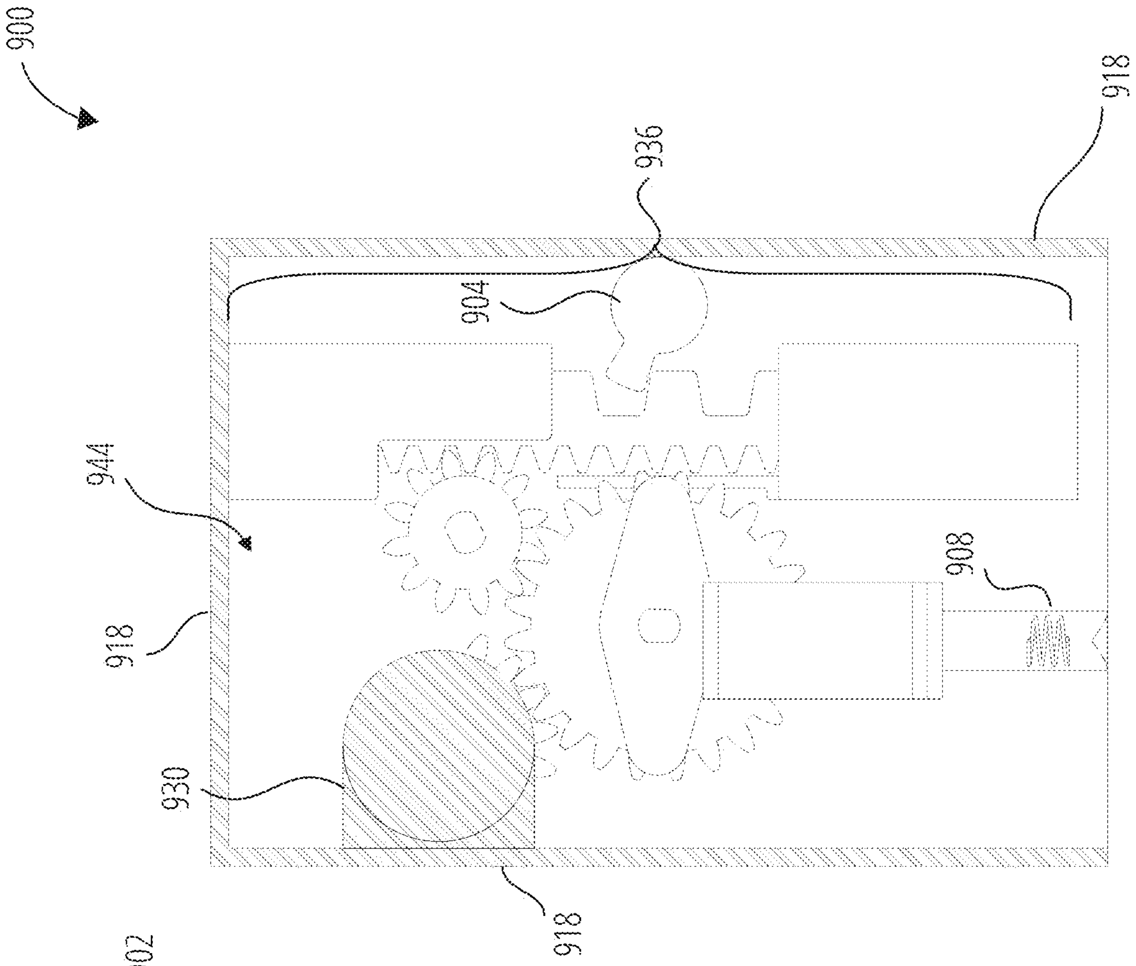
FIG. 15B illustrates a sectional view of the remote locking device 900 in an unlocked configuration in accordance with one embodiment.
Figure 15A:
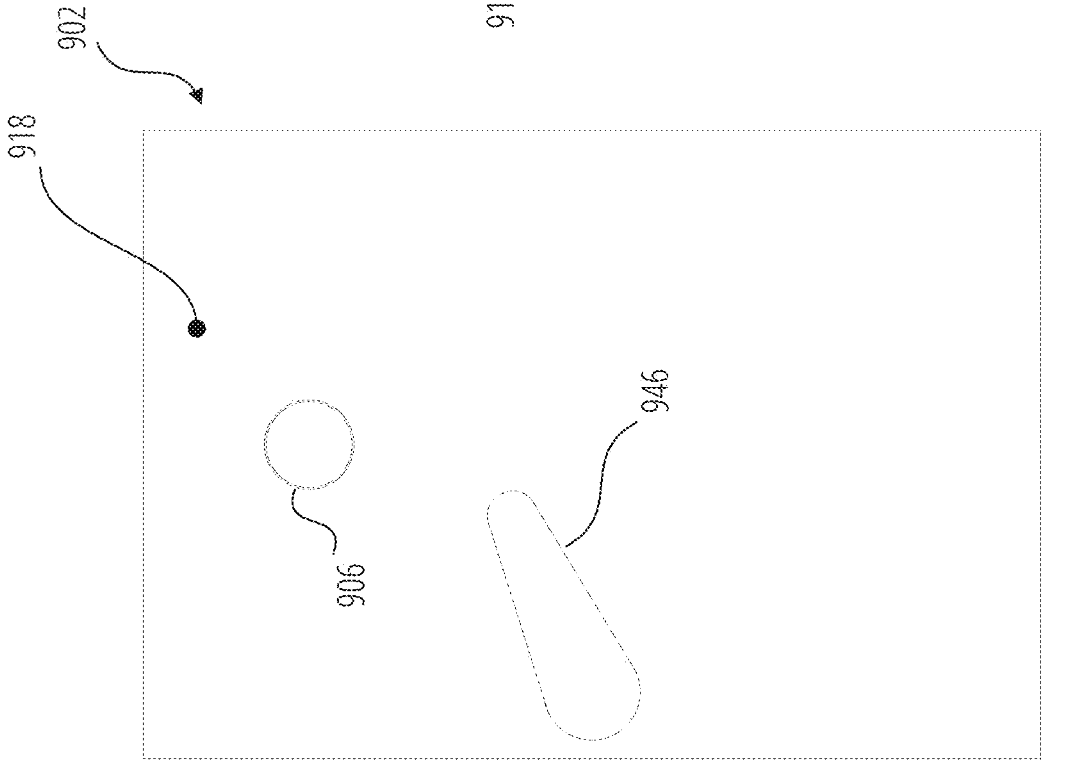
FIG. 15A illustrates a front view of the remote locking device 900 in an unlocked configuration in accordance with one embodiment.

FIG. 15A illustrates a front view of the remote locking device 900 in an unlocked configuration in accordance with one embodiment. The remote locking device 900 is shown with a lever 946 functioning as the manual release mechanism 904 on the exterior surface 918 of the housing 902. The lever 946 moves up or down depending on the engagement position, where the up position is unlocked.

FIG. 15B illustrates a sectional view of the remote locking device 900 and shows the manual release mechanism 904 engaged with a series of gears that are powered by a motor 930 but can be manually moved by changing the position of the lever 946. Additionally, the mechanical lock 936 includes a return spring for the bolt 908 to return to the unlocked configuration. The remote locking device 900 is shown with the mechanical lock 936 within the interior compartment 944 surrounded by the exterior surface 918.

Figure 16B:
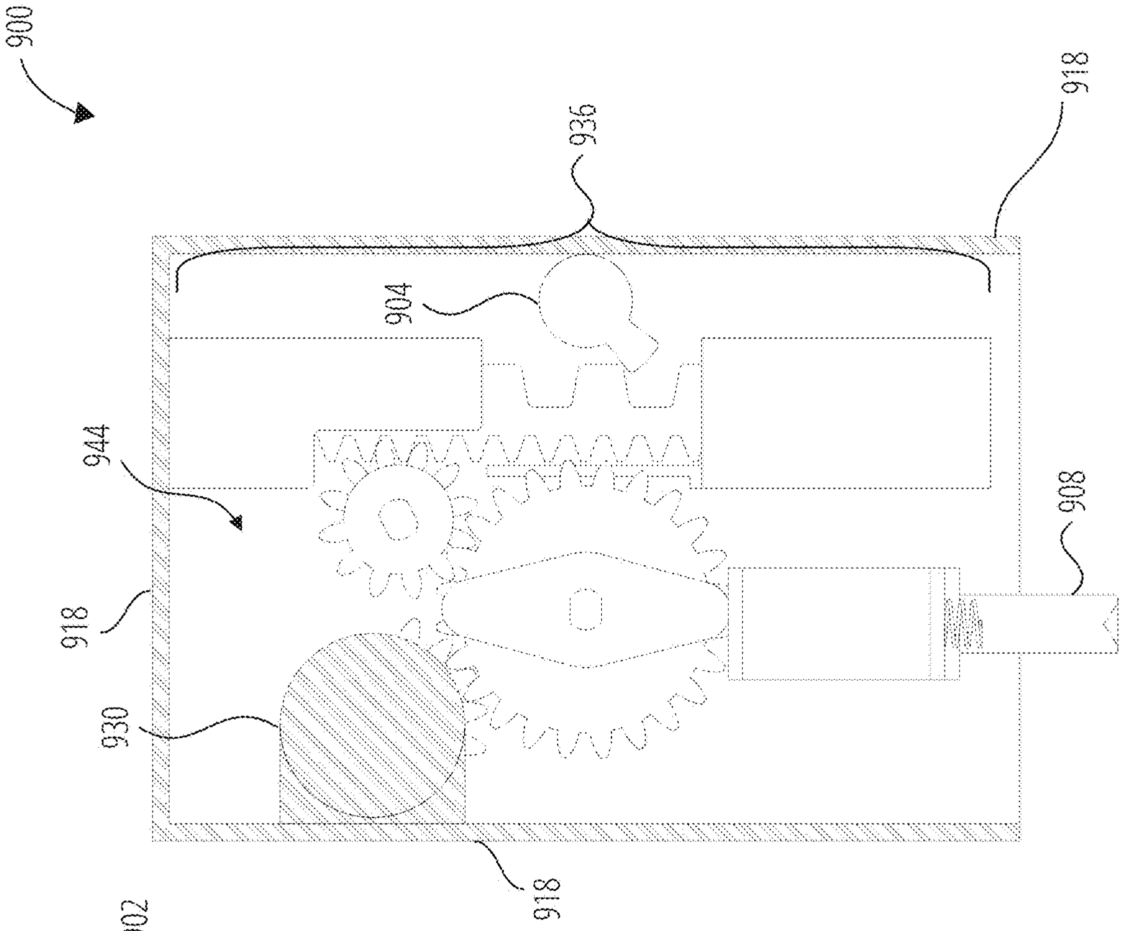
FIG. 16B illustrates a sectional view of the remote locking device 900 in a locked configuration in accordance with one embodiment.
Figure 16A:
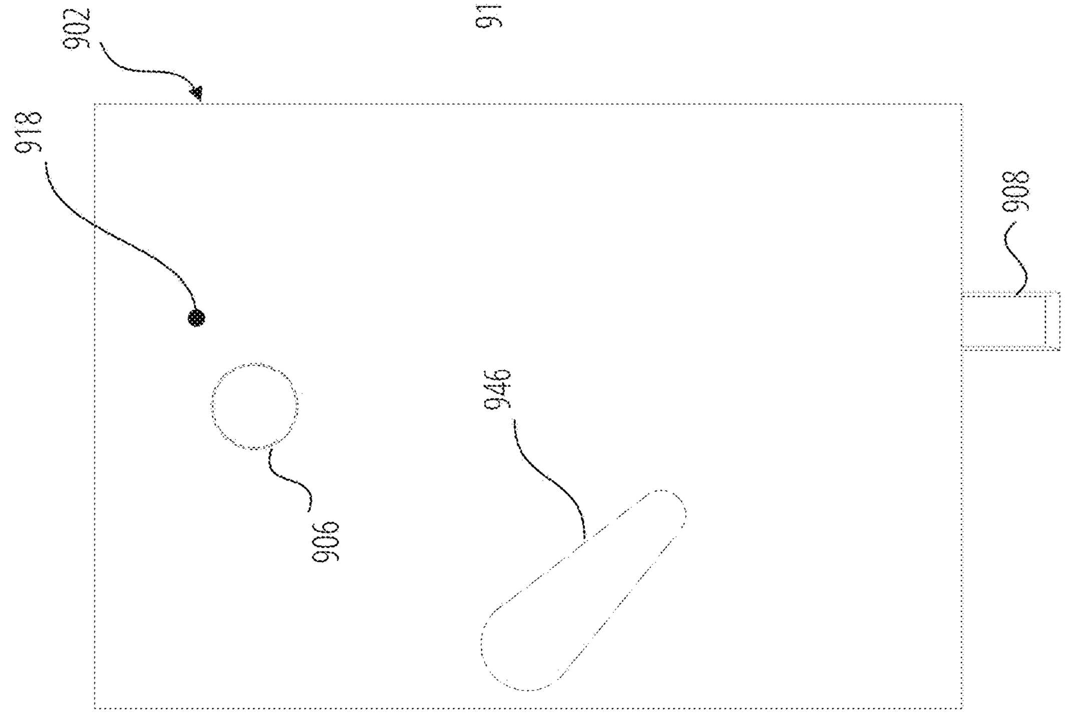
FIG. 16A illustrates a front view of the remote locking device 900 in a locked configuration in accordance with one embodiment.

FIG. 16A illustrates a front view of the remote locking device 900 in a locked configuration in accordance with one embodiment. The remote locking device 900 is shown with the lever 946 pointed downward indicating that the engagement position of the bolt 908 is in the locked configuration. The lever 946 is shown below the at least one input button 906 on the exterior surface 918 of the housing 902.

FIG. 16B illustrates a sectional view of the remote locking device 900 in a locked configuration in accordance with one embodiment. The remote locking device 900 is shown with the manual release mechanism 904 engaged with gears to push the bolt 908 into the slot 1004. The mechanical lock 936 is shown within the interior compartment 944 surrounded by the exterior surface 918.

Figure 17:
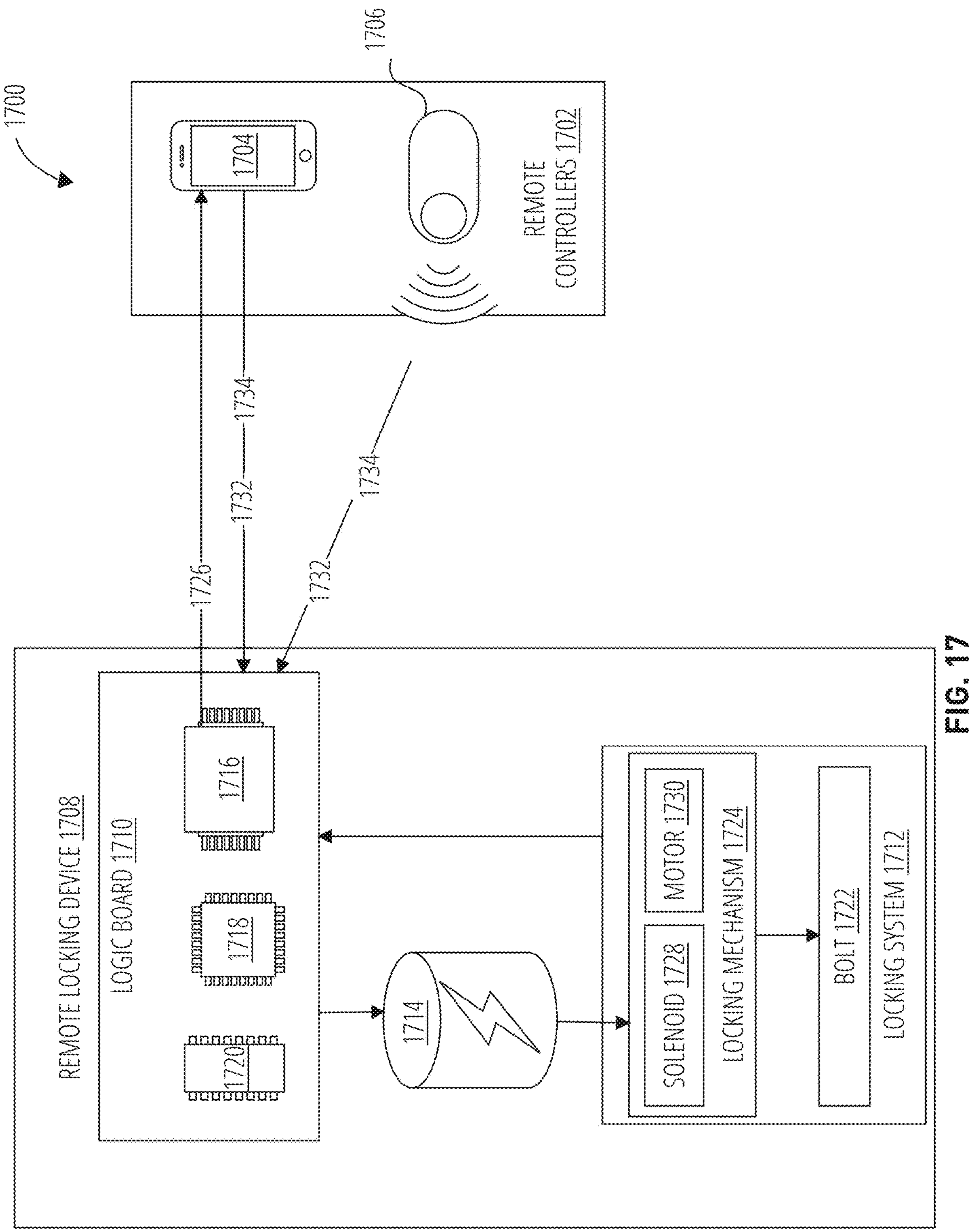
FIG. 17 illustrates a system diagram of the system 1700 in accordance with one embodiment.

FIG. 17 illustrates a system diagram of the system 1700 in accordance with one embodiment. The system 1700 comprises remote controllers 1702 and a remote locking device 1708. The remote controllers 1702 may be accomplished by the mobile device 1704 and/or a button operated controller 1706. The remote locking device 1708 comprises a logic board 1710, a power source 1714, and a locking system 1712. The logic board 1710 comprises memory 1720, a processor 1718, and communications module 1716. The locking system 1712 comprises a bolt 1722 and a locking mechanism 1724. The locking mechanism 1724 is driven by the power source 1714. The drivable components of a locking mechanism 1724 are a solenoid 1728 or a motor 1730 used to drive a mechanical lock.

In an embodiment, the remote sliding door locking system determines a bolt engagement status 1726 of a bolt 1722 in a locking system 1712 by powering a locking mechanism 1724 and detecting resistance. The resistance can be determined by the feedback from a solenoid 1728 or the motor 1730. The system 1700 communicates the bolt engagement status 1726 to remote controllers 1702 by way of a communications module 1716. The system 1700 operates the locking mechanism 1724 to drive the bolt 1722 to an engagement position in response to receiving a lock command 1732 from the remote controllers 1702 by way of the communications module 1716. The system 1700 operates the locking mechanism 1724 to drive the bolt 1722 to a disengagement position in response to receiving an unlock command 1734 from the remote controllers 1702 by way of the communications module 1716.

The mobile device 1704 may operate as a remote controller through the installation of an application that syncs with the remote locking device 1708. Syncing with the remote locking device 1708 may be done through a pairing process where the at least one input button is held down to activate a pairing mode.

Figure 18:
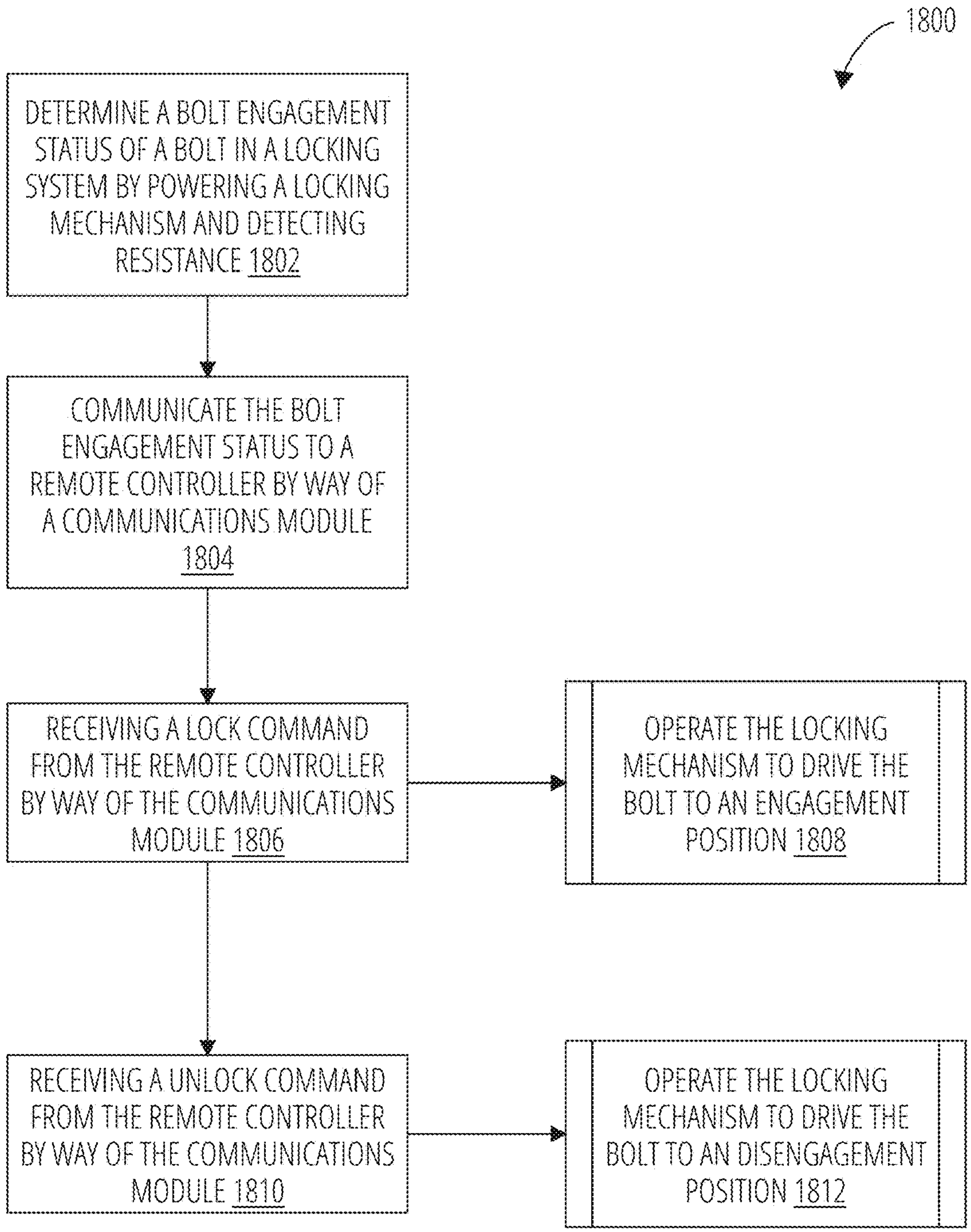
FIG. 18 illustrates a routine 1800 for operating a remote sliding door locking system in accordance with one embodiment.

In FIG. 18, a routine 1800 for operating a remote sliding door locking system involves determining a bolt engagement status of a bolt in a locking system by powering a locking mechanism and detecting resistance (block 1802). In block 1804, the routine 1800 communicates the bolt engagement status to a remote controller by way of a communications module. In block 1806, the routine 1800 receives a lock command from the remote controller by way of the communications module. In subroutine block 1808, the routine 1800 operates the locking mechanism to drive the bolt to an engagement position in response to block 1806. In block 1810, the routine 1800 receives an unlock command from the remote controller by way of the communications module. In subroutine block 1812, the routine 1800 operates the locking mechanism to drive the bolt to a disengagement position in response to block 1810.

Figure 19:
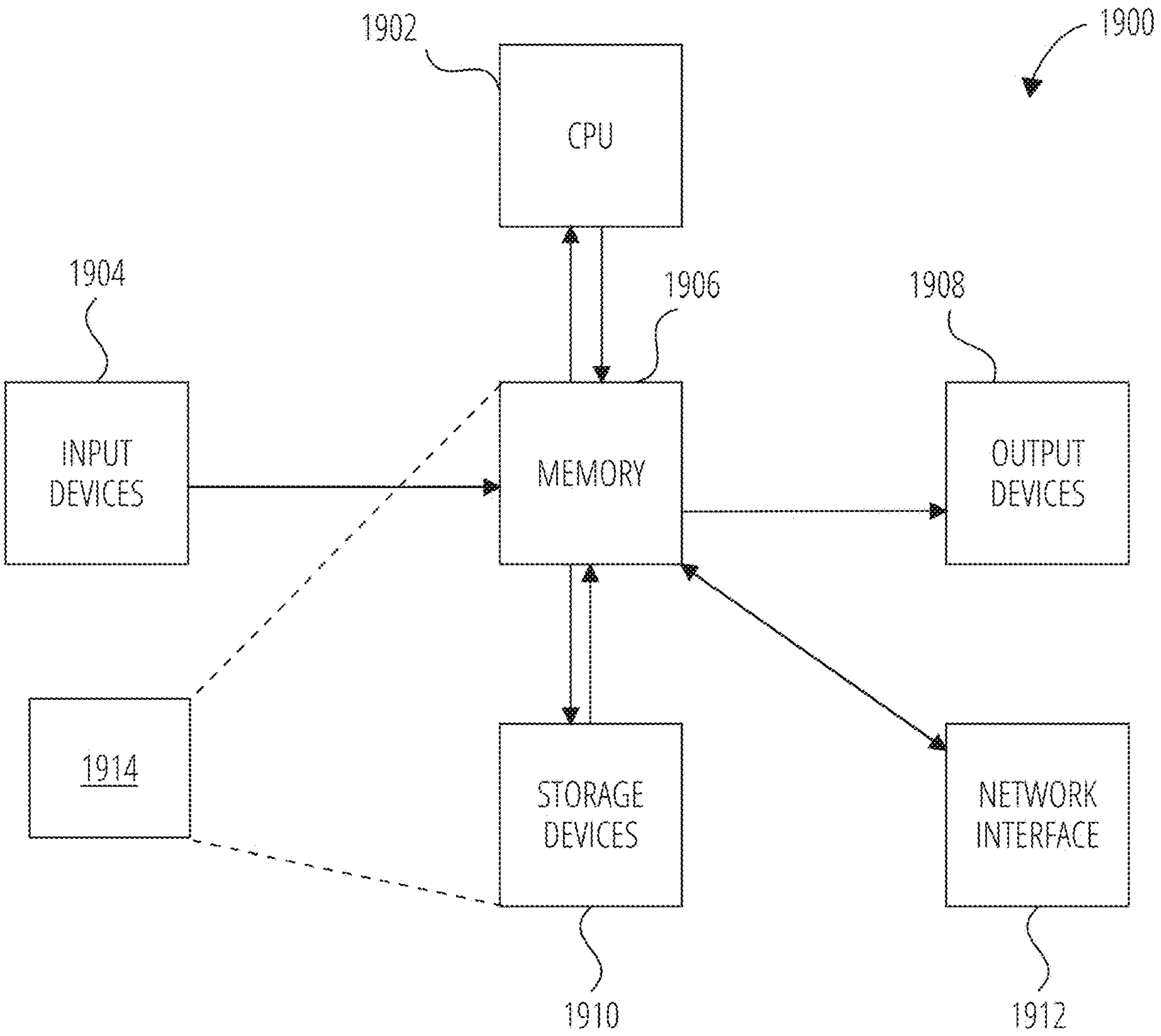
FIG. 19 illustrates an embodiment of an IoT device 1900 to implement components and process steps of the system described herein.

FIG. 19 illustrates an embodiment of an IoT device 1900 to implement components and process steps of IoT devices described herein.

Input devices 1904 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 1904 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 1904 are provided via various machine signal conductors (e.g., busses or network interfaces) and circuits to memory 1906.

The memory 1906 is typically what is known as a first or second level memory device, providing for storage (via configuration of matter or states of matter) of signals received from the input devices 1904, instructions and information for controlling operation of the CPU 1902, and signals from storage devices 1910.

The memory 1906 and/or the storage devices 1910 may store computer-executable instructions and thus forming logic 1914 that when applied to and executed by the CPU 1902 implement embodiments of the processes disclosed herein.

Information stored in the memory 1906 is typically directly accessible to the CPU 1902 of the device. Signals input to the device cause the reconfiguration of the internal material/energy state of the memory 1906, creating in essence a new machine configuration, influencing the behavior of the IoT device 1900 by affecting the behavior of the CPU 1902 with control signals (instructions) and data provided in conjunction with the control signals.

Second or third level storage devices 1910 may provide a slower but higher capacity machine memory capability. Examples of storage devices 1910 are hard disks, optical disks, large capacity flash memories or other non-volatile memory technologies, and magnetic memories.

The CPU 1902 may cause the configuration of the memory 1906 to be altered by signals in storage devices 1910. In other words, the CPU 1902 may cause data and instructions to be read from storage devices 1910 in the memory 1906 from which may then influence the operations of CPU 1902 as instructions and data signals, and from which it may also be provided to the output devices 1908. The CPU 1902 may alter the content of the memory 1906 by signaling to a machine interface of memory 1906 to alter the internal configuration, and then converted signals to the storage devices 1910 to alter its material internal configuration. In other words, data and instructions may be backed up from memory 1906, which is often volatile, to storage devices 1910, which are often non-volatile.

Output devices 1908 are transducers which convert signals received from the memory 1906 into physical phenomenon such as vibrations in the air, or patterns of light on a machine display, or vibrations (i.e., haptic devices) or patterns of ink or other materials (i.e., printers and 3-D printers).

The network interface 1912 receives signals from the memory 1906 and converts them into electrical, optical, or wireless signals to other machines, typically via a machine network. The network interface 1912 also receives signals from the machine network and converts them into electrical, optical, or wireless signals to the memory 1906.

Figure 20:
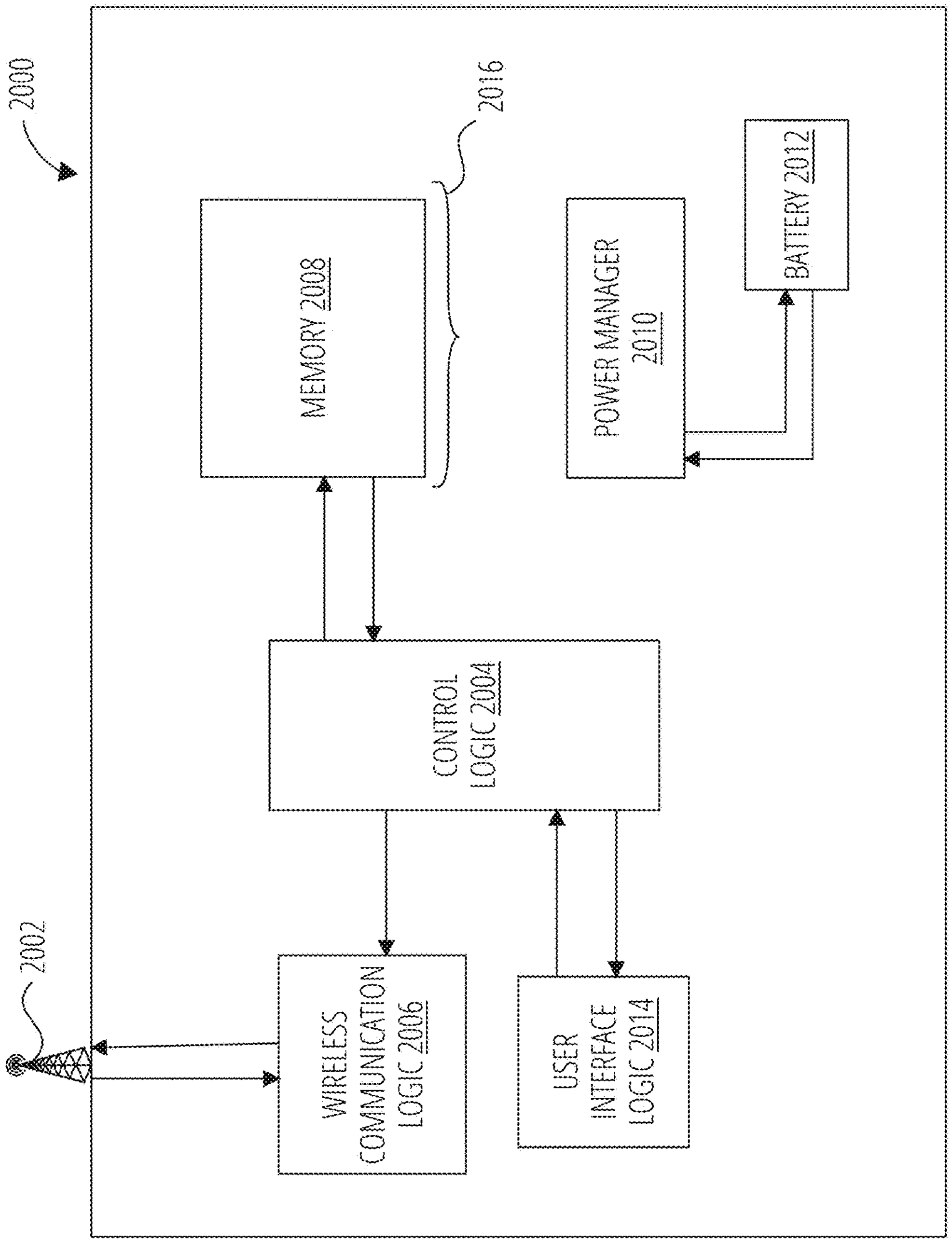
FIG. 20 illustrates an embodiment of an IoT device 2000.

Referring to FIG. 20, an IoT device 2000 in one embodiment comprises an antenna 2002, control logic 2004, wireless communication logic 2006, a memory 2008, a power manager 2010, a battery 2012, logic 2016, and user interface logic 2014.

The control logic 2004 controls and coordinates the operation of other components as well as providing signal processing for the IoT device 2000. For example, control logic 2004 may extract baseband signals from radio frequency signals received from the wireless communication logic 2006 logic, and processes baseband signals up to radio frequency signals for communications transmitted to the wireless communication logic 2006 logic. Control logic 2004 may comprise a central processing unit, digital signal processor, and/or one or more controllers or combinations of these components.

The wireless communication logic 2006 may further comprise memory 2008 which may be utilized by the control logic 2004 to read and write instructions (commands) and data (operands for the instructions). The memory 2008 may comprise logic 2016 to carry out aspects of the processes disclosed herein, e.g., those aspects executed by a smart phone or other mobile device.

A human user or operator of the IoT device 2000 may utilize the user interface logic 2014 to receive information from and input information to the IoT device 2000. Images, video and other display information, for example, user interface optical patterns, may be output to the user interface logic 2014, which may for example operate as a liquid crystal display or may utilize other optical output technology. The user interface logic 2014 may also operate as a user input device, being touch sensitive where contact or close contact by a use's finger or other device handled by the user may be detected by transducers. An area of contact or proximity to the user interface logic 2014 may also be detected by transducers and this information may be supplied to the control logic 2004 to affect the internal operation of the IoT device 2000 and to influence control and operation of its various components.

Audio signals may be provided to user interface logic 2014 from which signals output to one and more speakers to create pressure waves in the external environment representing the audio. The IoT device 2000 may convert audio phenomenon from the environment into internal electro or optical signals by operating a microphone and audio circuit (not illustrated).

The IoT device 2000 may operate on power received from a battery 2012. The battery 2012 capability and energy supply may be managed by a power manager 2010.

The IoT device 2000 may transmit wireless signals of various types and range (e.g., cellular, GPS, Wi-Fi, Bluetooth, and near field communication i.e., NFC). The IoT device 2000 may also receive these types of wireless signals. Wireless signals are transmitted and received using wireless communication logic 2006 logic coupled to one or more antenna 2002. Other forms of electromagnetic radiation may be used to interact with proximate devices, such as infrared (not illustrated).

Figure 21:
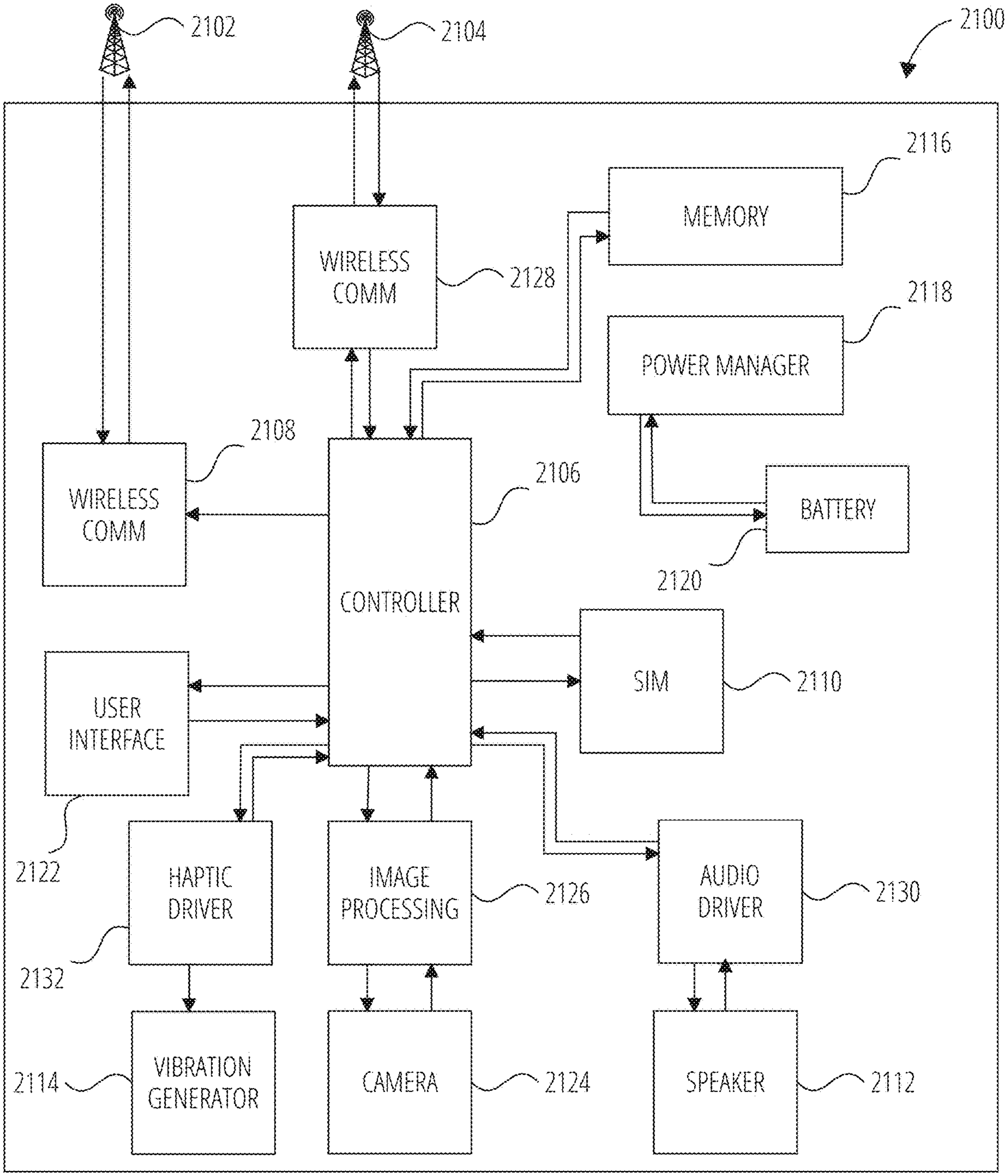
FIG. 21 illustrates an embodiment of an IoT device 2100.

Referring to the IoT device 2100 of FIG. 21, signal processing and system control 2106 controls and coordinates the operation of other components as well as providing signal processing for the IoT device 2100. For example, signal processing and system control 2106 may extract baseband signals from radio frequency signals received from the wireless communication 2108 logic, and processes baseband signals up to radio frequency signals for communications transmitted to the wireless communication 2108 logic. Signal processing and system control 2106 may comprise a central processing unit, digital signal processor, and/or one or more controllers or combinations of these components.

The wireless communication 2108 may further comprise memory 2116 which may be utilized by the signal processing and system control 2106 to read and write instructions (commands) and data (operands for the instructions).

A human user or operator of the IoT device 2100 may utilize the user interface 2122 to receive information from and input information to the IoT device 2100. Images, video and other display information, for example, user interface optical patterns, may be output to the user interface 2122, which may for example operate as a liquid crystal display or may utilize other optical output technology. The user interface 2122 may also operate as a user input device, being touch sensitive where contact or close contact by a use's finger or other device handled by the user may be detected by transducers. An area of contact or proximity to the user interface 2122 may also be detected by transducers and this information may be supplied to the signal processing and system control 2106 to affect the internal operation of the IoT device 2100 and to influence control and operation of its various components.

A camera 2124 may interface to image processing 2126 logic to record images and video from the environment. The image processing 2126 may operate to provide image/video enhancement, compression, and other transformations, and from there to the signal processing and system control 2106 for further processing and storage to memory 2116. Images and video stored in the memory 2116 may also be read by the signal processing and system control 2106 and output to the user interface 2122 for display to a user of the IoT device 2100.

Audio signals may be provided to user interface 2122 from which signals output to one or more speakers to create pressure waves in the external environment representing the audio. The IoT device 2100 may convert audio phenomenon from the environment into internal electro or optical signals by operating a microphone and audio circuit (not illustrated).

The IoT device 2100 may operate on power received from a battery 2120. The battery 2120 capability and energy supply may be managed by a power manager 2118.

The IoT device 2100 may transmit wireless signals of various types and range (e.g., cellular, Wi-Fi, Bluetooth, and near field communication i.e., NFC). The IoT device 2100 may also receive these types of wireless signals. Cellular wireless signals are transmitted and received using wireless communication 2108 logic coupled to one or more antenna 2102. Shorter-range wireless signals may be transmitted and received via antenna 2104 and wireless communication logic 2128. Other forms of electromagnetic radiation may be used to interact with proximate devices, such as infrared (not illustrated).

The device may utilize a haptic driver 2132 which controls a vibration generator 2114 to cause vibrations in response to events identified by signal processing and system control 2106, such as the received text messages, emails, incoming calls or other events that require the user or the device's attention.

A subscriber identity module (SIM 2110) may be present in some mobile devices, especially those operated on the Global System for Mobile Communication (GSM) network. The SIM 2110 stores, in machine-readable memory, personal information of a mobile service subscriber, such as the subscriber's cell phone number, address book, text messages, and other personal data. A user of the IoT device 2100 can move the SIM 2110 to a different and maintain access to their personal information. A SIM 2110 typically has a unique number which identifies the subscriber to the wireless network service provider.

The IoT device 2100 may include an audio driver 2130 including an audio encoder/decoder for encoding and decoding digital audio files or audio files stored by memory 2116, SIM 2110, or received in real time via one of the antenna 2102, antenna 2104. The audio driver 2130 is controlled by the signal processing and system control 2106 and decoded audio is provided to one and more speaker 2112 to create pressure waves in the external environment representing the audio.

Figure 22:
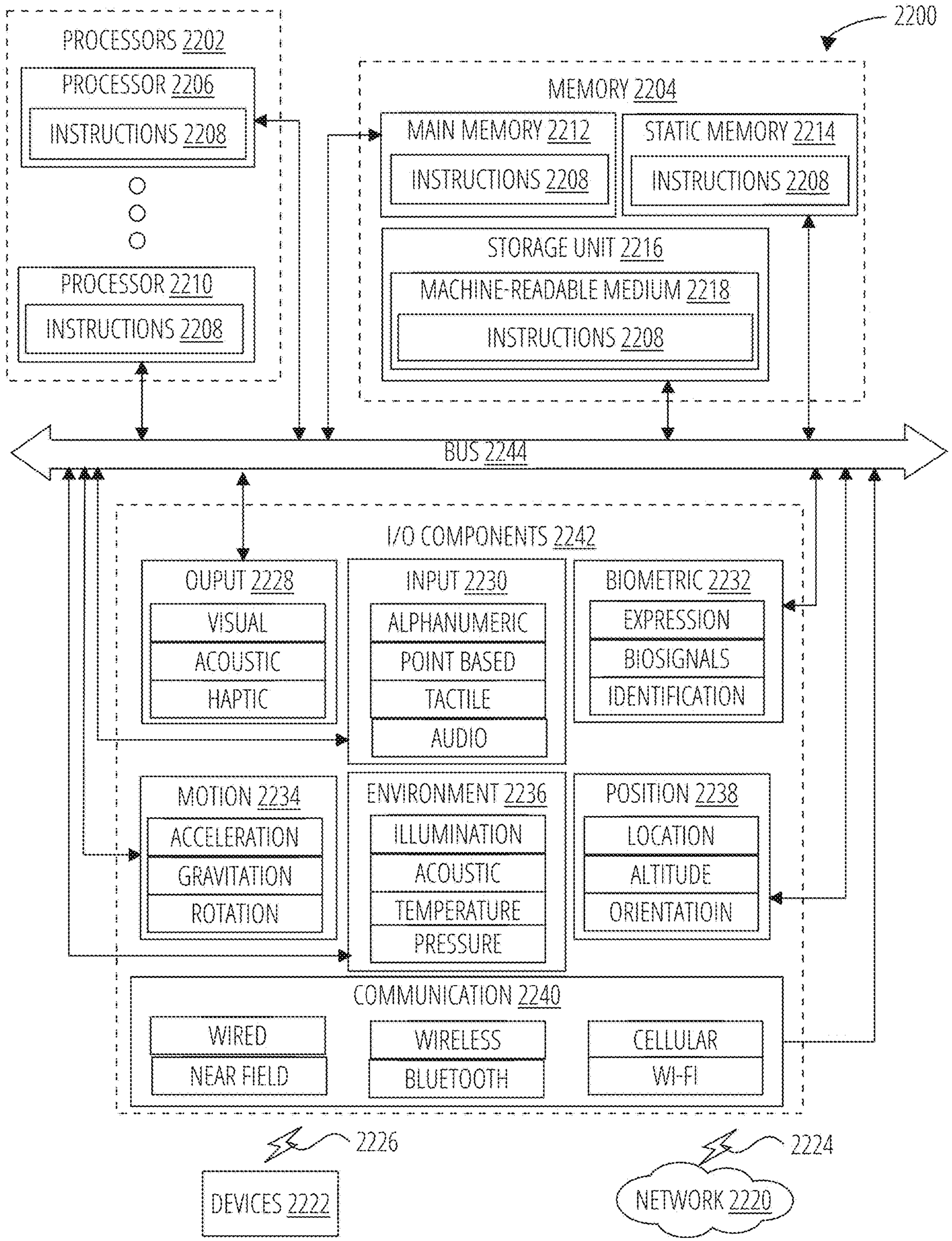
FIG. 22 illustrates a diagrammatic representation of an IoT device 2200 in the form of a computer system within which a set of instructions may be executed for causing the machine to perform any one or more of the IoT functionalities discussed herein, according to an example embodiment.

FIG. 22 illustrates a diagrammatic representation of an IoT device 2200 in the form of a computer system within which a set of instructions may be executed for causing the IoT device 2200 to perform any one or more of the methodologies discussed herein, according to an example embodiment. Specifically, FIG. 22 shows a diagrammatic representation of the IoT device 2200 in the example form of a computer system, within which instructions 2208 (e.g., software, a program, an application, an applet, an app, or other executable code) for causing the IoT device 2200 to perform any one or more of the methodologies discussed herein may be executed.

The instructions 2208 transform the general, non-programmed IoT device 2200 into a particular IoT device 2200 programmed to carry out the described and illustrated functions in the manner described. In alternative embodiments, the IoT device 2200 operates as a standalone device or may be coupled (e.g., networked) to other machines. In a networked deployment, the IoT device 2200 may operate in the capacity of a server machine or a client machine in a server-client network environment, or as a peer machine in a peer-to-peer (or distributed) network environment. The IoT device 2200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2208, sequentially or otherwise, that specify actions to be taken by the IoT device 2200.

Further, while only a single IoT device 2200 is illustrated, the term "machine" shall also be taken to include a collection of machines 200 that individually or jointly execute the instructions 2208 to perform any one or more of the methodologies discussed herein.

The IoT device 2200 may include processors 2202, memory 2204, and I/O components 2242, which may be configured to communicate with each other such as via a bus 2244. In an example embodiment, the processors 2202 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 2206 and a processor 2210 that may execute the instructions 2208. The term "processor" is intended to include multi-core processors that may comprise two or more independent processors (sometimes referred to as "cores") that may execute instructions contemporaneously. Although FIG. 22 shows multiple processors 2202, the IoT device 2200 may include a single processor with a single core, a single processor with multiple cores (e.g., a multi-core processor), multiple processors with a single core, multiple processors with multiples cores, or any combination thereof.

The memory 2204 may include a main memory 2212, a static memory 2214, and a storage unit 2216, both accessible to the processors 2202 such as via the bus 2244. The main memory 2204, the static memory 2214, and storage unit 2216 store the instructions 2208 embodying any one or more of the methodologies or functions described herein. The instructions 2208 may also reside, completely or partially, within the main memory 2212, within the static memory 2214, within machine-readable medium 2218 within the storage unit 2216, within at least one of the processors 2202 (e.g., within the processor's cache memory), or any suitable combination thereof, during execution thereof by the IoT device 2200.

The I/O components 2242 may include a wide variety of components to receive input, provide output, produce output, transmit information, exchange information, capture measurements, and so on. The specific I/O components 2242 that are included in a particular machine will depend on the type of machine. For example, portable machines such as mobile phones will likely include a touch input device or other such input mechanisms, while a headless server machine will likely not include such a touch input device. It will be appreciated that the I/O components 2242 may include many other components that are not shown in FIG. 22. The I/O components 2242 are grouped according to functionality merely for simplifying the following discussion and the grouping is in no way limiting. In various example embodiments, the I/O components 2242 may include output components 2228 and input components 2230. The output components 2228 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2230 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 2242 may include biometric components 2232, motion components 2234, environmental components 2236, or position components 2238, among a wide array of other components. For example, the biometric components 2232 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 2234 may include acceleration sensor components (e.g., accelerometer), gravitation sensor components, rotation sensor components (e.g., gyroscope), and so forth. The environmental components 2236 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2238 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2242 may include communication components 2240 operable to couple the IoT device 2200 to a network 2220 or devices 2222 via a coupling 2224 and a coupling 2226, respectively. For example, the communication components 2240 may include a network interface component or another suitable device to interface with the network 2220. In further examples, the communication components 2240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2222 may be another machine or any of a wide variety of peripheral devices (e.g., a peripheral device coupled via a USB).

Moreover, the communication components 2240 may detect identifiers or include components operable to detect identifiers. For example, the communication components 2240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2240, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., memory 2204, main memory 2212, static memory 2214, and/or memory of the processors 2202) and/or storage unit 2216 may store one or more sets of instructions and data structures (e.g., software) embodying or utilized by any one or more of the methodologies or functions described herein. These instructions (e.g., the instructions 2208), when executed by processors 2202, cause various operations to implement the disclosed embodiments.

Although the invention has been explained in relation to its preferred embodiment, it is to be understood that many other possible modifications and variations can be made without departing from the spirit and scope of the invention as hereinafter claimed.

What is claimed is:

1. A remote sliding door locking system comprising:
- a locking plate;
- a remote controller;
- a remote locking device comprising:
  - a housing;
  - a logic board;
  - a locking system; and
  - a power source;
- the housing comprising an interior compartment, a mounting plate, and an exterior surface, wherein the exterior surface comprising a release mechanism slot, at least one input button, and at least one status indicator;
- the logic board comprising a processor, a memory, and a communications module;
- the locking system comprising a bolt, a locking mechanism, and a manual release mechanism, wherein the manual release mechanism is operatively engaged to the locking mechanism to drive the movement of the bolt;

the manual release mechanism traverses the exterior surface by way of the release mechanism slot;

the logic board, the bolt, the locking mechanism, and the power source being housed within the interior compartment;

the locking plate comprising a slot;

the at least one input button and the at least one status indicator being operatively coupled to the logic board;

the housing being configured to attach to a sliding door by way of the mounting plate;

the locking plate being configured to attach to a sliding door frame;

the bolt being operatively aligned with the slot;

the logic board being communicably coupled to the remote controller by way of the communications module; and the logic board and the power source being operatively coupled to the locking system to engage and disengage bolt from the slot by way of the locking mechanism.

2. The remote sliding door locking system of claim 1 further comprising:

the locking mechanism comprising a solenoid operatively configured to drive the bolt.

3. The remote sliding door locking system of claim 1 further comprising:

the locking mechanism comprising a mechanical lock and a motor.

4. The remote sliding door locking system of claim 1 further comprising:

the locking system comprising optical sensors; and the optical sensors being operatively coupled to the logic board, wherein the optical sensors detect alignment between the bolt and the slot.

5. The remote sliding door locking system of claim 1, wherein the at least one status indicator comprises a battery status indicator and a wireless connectivity indicator.

6. The remote sliding door locking system of claim 1, wherein the at least one input button is configured to pair the remote controller with the logic board.

7. The remote sliding door locking system of claim 1, wherein the at least one input button includes a status indicator for the engagement of the bolt with the slot.

8. The remote sliding door locking system of claim 1, wherein the power source is a rechargeable battery.

9. The remote sliding door locking system of claim 1, wherein the power source is a removable battery.

10. The remote sliding door locking system of claim 1, wherein the remote controller is button-operated controller operating in communication with the communications module.

11. The remote sliding door locking system of claim 1, wherein the remote controller is an application operating on a mobile device in communication with communications module.

12. A remote sliding door locking system comprising:

a locking plate;

a remote controller;

a remote locking device comprising:

a housing;

a logic board;

a locking system; and a power source;

the housing comprising an interior compartment, a mounting plate, and an exterior surface comprising a release mechanism slot, at least one input button, and at least one status indicator;

the logic board comprising a processor, a memory, and a communications module;

the locking system comprising a bolt, a locking mechanism, and a manual release mechanism, wherein the manual release mechanism is operatively engaged to the locking mechanism to drive the movement of the bolt;

the manual release mechanism traverses the exterior surface by way of the release mechanism slot;

the logic board, the bolt, the locking mechanism, and the power source being housed within the interior compartment;

the locking plate comprising a slot;

the at least one input button and the at least one status indicator being operatively coupled to the logic board;

the housing being configured to attach to a sliding door by way of the mounting plate;

the locking plate being configured to attach to a sliding door frame;

the bolt being operatively aligned with the slot;

the logic board being communicably coupled to the remote controller by way of the communications module;

the logic board and the power source being operatively coupled to the locking system to engage and disengage bolt from the slot by way of the locking mechanism;

the locking system comprising optical sensors;

the optical sensors being operatively coupled to the logic board, wherein the optical sensors detect alignment between the bolt and the slot;

wherein the at least one status indicator comprising a battery status indicator and a wireless connectivity indicator;

wherein the at least one input button is configured to pair the remote controller with the logic board; and wherein the at least one input button includes a status indicator for the engagement of the bolt with the slot.

13. The remote sliding door locking system of claim 1 further comprising:

the locking mechanism comprising a solenoid operatively configured to drive the bolt.

14. The remote sliding door locking system of claim 1 further comprising:

the locking mechanism comprising a mechanical lock and a motor.

15. The remote sliding door locking system of claim 1, wherein the power source is a rechargeable battery.

16. The remote sliding door locking system of claim 1, wherein the power source is a removable battery.

17. The remote sliding door locking system of claim 1, wherein the remote controller is a button-operated controller operating in communication with the communications module.

18. The remote sliding door locking system of claim 1, wherein the remote controller is an application operating on a mobile device in communication with communications module.

* * * * *